US008724989B2

(12) United States Patent
Mori

(10) Patent No.: US 8,724,989 B2
(45) Date of Patent: May 13, 2014

(54) OPTICAL PACKET SWITCHING SYSTEM

(75) Inventor: Shota Mori, Kawasaki (JP)

(73) Assignee: Fujitsu Telecom Networks Limited, Kanagawa (JP)

( * ) Notice: Subject to any disclaimer, the term of this patent is extended or adjusted under 35 U.S.C. 154(b) by 88 days.

(21) Appl. No.: 13/433,181

(22) Filed: Mar. 28, 2012

(65) Prior Publication Data

US 2012/0251109 A1 Oct. 4, 2012

(30) Foreign Application Priority Data

Mar. 30, 2011 (JP) ................................ 2011-075759

(51) Int. Cl.
*H04J 14/00* (2006.01)
*H04L 12/28* (2006.01)

(52) U.S. Cl.
USPC ............... 398/51; 398/45; 398/48; 370/395.4

(58) Field of Classification Search
None
See application file for complete search history.

(56) References Cited

U.S. PATENT DOCUMENTS 6,721,315 B1 * 4/2004 Xiong et al. .................. 370/389
2003/0161632 A1 * 8/2003 Wang .............................. 398/48
2006/0120379 A1 * 6/2006 Beshai ........................ 370/395.4
2009/0060506 A1 * 3/2009 Matsunaga et al. ............. 398/53
2009/0067837 A1 * 3/2009 Hesse et al. ..................... 398/51

FOREIGN PATENT DOCUMENTS

JP 2001-244980 9/2001
JP 2008-235986 10/2008

OTHER PUBLICATIONS

JPO Office action dated Sep. 3, 2013, for corresponding Japanese Patent application 2011-075759, (4 pages).

* cited by examiner

*Primary Examiner* — Ken Vanderpuye
*Assistant Examiner* — Merlin Brito Peguero
(74) *Attorney, Agent, or Firm* — Christie, Parker & Hale, LLP

(57) ABSTRACT

An optical packet switching system includes optical packet switching apparatus and an optical packet transmitting apparatus. The optical packet switching apparatus includes client optical delay units for delaying optical packet signals, network optical delay units for delaying one of the network optical packet signals, the network optical delay unit having a longer delay time than the client optical delay unit, an optical switch unit for switching the route of the inputted client optical packet signal so as to be sent out, an optical switch control unit for controlling the optical switch unit. The optical switch control unit is configured in such a manner as to detect a free time slot. The optical packet transmitting apparatus adjusts transmit timing, with which the client optical packet signal is sent out, in such a manner that the client optical packet signal is inserted into the free time slot.

12 Claims, 22 Drawing Sheets

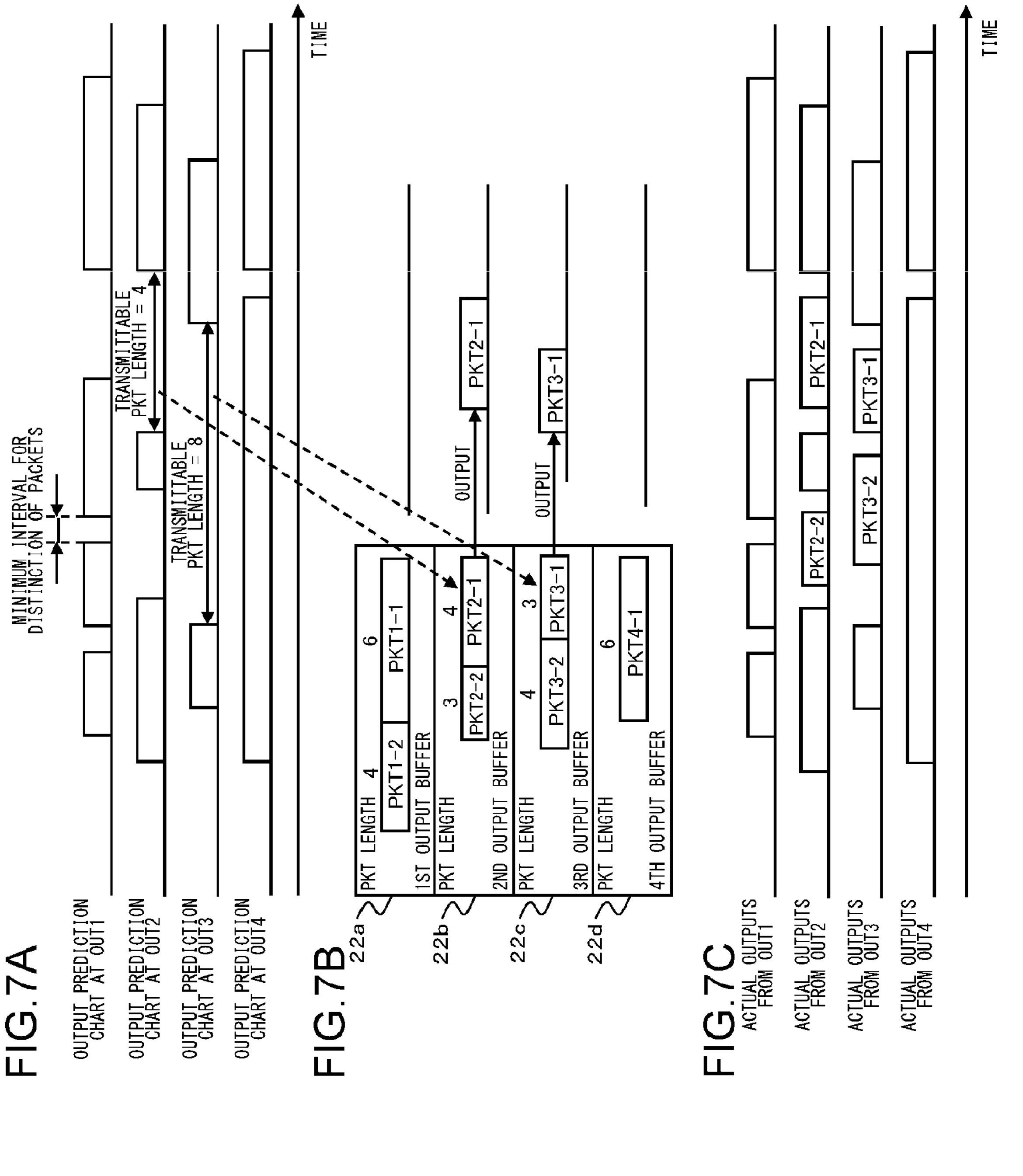
FIG.7A
OUTPUT PREDICTION CHART AT OUT1
OUTPUT PREDICTION CHART AT OUT2
OUTPUT PREDICTION CHART AT OUT3
OUTPUT PREDICTION CHART AT OUT4
MINIMUM INTERVAL FOR DISTINCTION OF PACKETS
TRANSMITTABLE PKT LENGTH = 4
TRANSMITTABLE PKT LENGTH = 8
TIME
FIG.7B
22a
22b
22c
22d
PKT LENGTH 4 6
PKT1-2 PKT1-1
1ST OUTPUT BUFFER
PKT LENGTH 3 4
PKT2-2 PKT2-1
2ND OUTPUT BUFFER
PKT LENGTH 4 3
PKT3-2 PKT3-1
3RD OUTPUT BUFFER
PKT LENGTH 6
PKT4-1
4TH OUTPUT BUFFER
OUTPUT
PKT2-1
OUTPUT
PKT3-1
FIG.7C
ACTUAL OUTPUTS FROM OUT1
ACTUAL OUTPUTS FROM OUT2
ACTUAL OUTPUTS FROM OUT3
ACTUAL OUTPUTS FROM OUT4
PKT2-2
PKT2-1
PKT3-2
PKT3-1
TIME

FIG.9

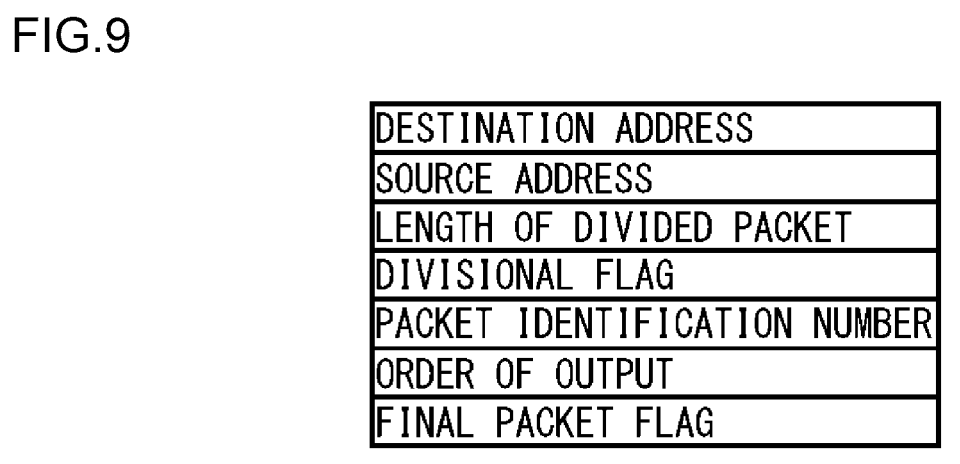

| |
|---|
| DESTINATION ADDRESS |
| SOURCE ADDRESS |
| LENGTH OF DIVIDED PACKET |
| DIVISIONAL FLAG |
| PACKET IDENTIFICATION NUMBER |
| ORDER OF OUTPUT |
| FINAL PACKET FLAG |

OUTPUT PREDICTION CHART AT OUT1
λ1
λ2
λ3
λ4
VISIBLE RANGE
TRANSMITTABLE PKT LENGTH = 6
TRANSMITTABLE PKT LENGTH = 10
TIME

22a
PKT LENGTH 4 6
PKT1-2
PKT1-1
1ST OUTPUT BUFFER
23
2ND SELEC-TOR
24
E/O
E/O
E/O
E/O
λ1
λ2
λ3
λ4
WDM
29
CL_IN

WAVELENGTH
ACTUAL OUTPUTS FROM OUT1
λ1
λ2
λ3
λ4
PKT1-1
PKT1-2
TIME

FIG.18

| |
|---|
| DESTINATION ADDRESS |
| SOURCE ADDRESS |
| PACKET LENGTH |
| INFORMATION ON FREQUENCY IN USE |

OPTICAL PACKET SWITCHING SYSTEM

CROSS-REFERENCE TO RELATED APPLICATION

This application claims priority to and the benefit of Japanese Patent Application Number 2011-075759, filed on Mar. 30, 2011, the entire disclosure of which is incorporated herein by reference.

BACKGROUND OF THE INVENTION

1. Field of the Invention

The present invention relates to an optical packet switching system which enables packet switching for each optical packet by switching an optical switch according to destination information given to an optical packet signal.

2. Description of the Related Art

In optical transmission systems employing wavelength division multiplexing (WDM), a technique that performs the path switching per wavelength by the use of a wavelength selective switch (WSS) and the like is put to practical use. As a technology that may succeed this technique, an optical packet switching method is now being investigated. In this optical packet switching method, an IP packet (10 G Ether (10 Gigabit Ethernet (registered trademark) signal and the like), for example, is used as a small unit with which the switching is performed, and each is converted into the form of an optical packet and then the route is switched by an ultrahigh-speed optical switch (see Reference (1) in the following Related Art List, for instance).

The IP packet does not transfer any significant information in the absence of data therein, so that the bandwidth corresponding thereto is wasted. However, if the optical packet switching system is realized, then the time slot of a packet where data is absent can be occupied by another packet. Therefore, the optical packet switching system is considered a promising technology of the future which is capable of markedly enhancing the bandwidth usage efficiency of the transmission path.

RELATED ART LIST (1) Japanese Unexamined Patent Application Publication No. 2008-235986.

In the optical switching method, there are cases, however, where two optical packet signals, which have arrived almost simultaneously at two ports of the optical switch, for example, request their outputs to the same output port. In such a case, the optical packet signal, which had arrived earlier, is preferentially passed, whereas the optical packet, which had arrived later, is discarded. Where the usage rate of optical packet line is low, the probability of the optical packet signals being discarded is low and therefore no problem arises. However, as the usage rate of optical packet line increases as a result of increased number of optical packets to the network, the optical packet signals are frequently discarded, thereby possibly degrading the communication quality.

SUMMARY OF THE INVENTION

The present invention has been made in view of the foregoing circumstances, and a general purpose is to provide a technology for reducing the optical packet discarding rate in the optical packet switching method.

In order to resolve the above-described problems, an optical packet switching system according to one embodiment of the present invention includes: an optical packet switching apparatus configured to switch a route of an inputted optical packet signal; and an optical packet transmitting apparatus configured to generate a client optical packet signal from a received client signal and configured to send out the generated client optical packet signal to the optical packet switching apparatus. The optical packet switching apparatus includes: a client branching unit configured to branch off the client optical packet signal fed from the optical packet transmitting apparatus; a network branching unit configured to branch off a network optical packet signal fed from another optical packet switching system; a client optical delay unit configured to delay one of the branched-off client optical packet signals branched off by the client branching unit; a network optical delay unit configured to delay one of the branched-off network optical packet signals branched off by the network branching unit, the network optical delay unit having a longer delay time than that of the client optical delay unit; an optical switch unit having a client input port for inputting the client optical packet signal fed from the client optical delay unit, a network input port for inputting the network optical packet signal fed from the network optical delay unit, and an output port, the optical switch unit being configured to switch the route of the inputted client optical packet signal and the network optical packet signal so as to be sent out from the output port; and an optical switch control unit configured to input both the other of the branched-off client optical packet signals branched off by the client branching unit and the other of the branched-off network optical packet signals branched off by the network branching unit and configured to control the optical switch unit based on an analysis result of the inputted optical packet signals. The optical switch control unit is configured such that a free time slot, during which no network optical packet signal is sent out from the output port, is detected. The optical packet transmitting apparatus adjusts transmit timing, with which the client optical packet signal is sent out, in such a manner that the client optical packet signal is inserted into the free time slot.

The optical switch control unit may be so configured as to convey transmittable timing and transmittable packet length of the client optical packet signal to the optical packet transmitting apparatus, based on the detected free time slot. The optical packet transmitting apparatus may further include: an input buffer configured to store the received client signal; a packet generator configured to generate a client packet signal by adding a header, containing packet length information, to the client signal stored in the input buffer; an output buffer configured to store the generated client packet signal, wherein, when the packet length of the client packet signal stored in a head is shorter than or equal to the transmittable packet length of the client packet signal, the output buffer outputs the client packet signal in time with the transmittable timing; and an electrical/optical converter configured to convert the client packet signal outputted from the output buffer into a client optical packet signal and configured to send out the converted client optical packet signal to the optical packet switching apparatus.

When the packet length of the client packet signal stored in the head is longer than the transmittable packet length, the output buffer may divide the client packet signal into a plurality of signals each of which is shorter than or equal in length to the transmittable packet length, and output the divided packet signals.

The output buffer may append to each of the divided packet signals a divisional flag indicating that each of the divided packet signals is a client packet signal after division, a packet identification number by which to distinguish from other client packet signals, an output order from the output buffer, and a final packet flag indicating whether the each thereof is a divided packet signal outputted last or not.

When the packet length of the client packet signal stored in the head is longer than the transmittable packet length, the output buffer may search for a client packet having a packet length shorter than or equal to the transmittable packet length from among client packet signals stored thereafter and output the found client packet signal, if any.

When the packet length of the client packet signal stored in the head is shorter than or equal to the transmittable packet length, the output buffer may search for a client packet whose packet length is shorter than a difference calculated by subtracting the packet length of the client packet signal stored at the head from the transmittable packet length from among client packet signals stored thereafter, and output the found client packet signal following the client packet signal at the head.

The optical switch control unit may include: a network analysis unit for detecting the time of arrival and packet length of the network optical packet signal; an output-prediction-chart generator for generating an output prediction chart that indicates a temporal location of the network optical packet signal at the output port, based on the detected arrival time and packet length thereof, and conveying the transmittable timing and the transmittable packet length to the optical packet transmitting apparatus based on the output prediction chart; a client analysis unit for detecting the time of arrival and packet length of the client optical packet signal outputted from the optical packet transmitting apparatus, when the transmittable timing and the transmittable packet length have been conveyed; and a control signal generator for determining whether to pass or discard the network optical packet signal and the client optical packet signal at the output port, based on the time of arrival and the packet length from the client analysis unit and the output prediction chart from the output-prediction-chart generator, and outputting a control signal to the optical switch unit.

The optical packet transmitting apparatus may further include: an input buffer configured to store the received client signal; a packet generator configured to generate a client packet signal by adding a header, containing packet length information, to the client signal stored in the input buffer; an output buffer configured to store the generated client packet signal and configured to convey the packet length information on a client packet signal stored in the head to the optical packet switching apparatus, wherein, when a transmission start trigger is conveyed from the switch control unit, the output buffer outputs the client packet signal; and an electrical/optical converter configured to convert the client packet signal outputted from the output buffer into a client optical packet signal and send out the converted signal to the optical packet switching apparatus.

The optical switch control unit may include: a network analysis unit for detecting the time of arrival and the packet length of the network optical packet signal from the network branching unit; an output-prediction-chart generator for generating an output prediction chart that indicates a temporal location of the network optical packet signal at the output port, based on the detected arrival time and packet length thereof, wherein, when a transmittable packet length of the free time slot detected from the output prediction chart is greater than or equal to the packet length of the client packet signal conveyed from the optical packet transmitting apparatus, the output-prediction-chart generator conveys the transmission start trigger to the optical packet transmitting apparatus; a client analysis unit for detecting the time of arrival and packet length of the client optical packet signal outputted from the optical packet transmitting apparatus, when the transmission start trigger has been received; and a control signal generator for determining whether to pass or discard the network optical packet signal and the client optical packet signal at the output port, based on the time of arrival and the packet length from the client analysis unit and the output prediction chart from the output-prediction-chart generator, and outputting a control signal to the optical switch unit.

Another embodiment of the present invention relates also to an optical packet switching system. The optical packet switching system includes: an optical packet switching apparatus configured to switch a route of an inputted optical packet signal; and an optical packet transmitting apparatus configured to generate a client optical packet signal from a received client signal and configured to send out the client optical packet signal to the optical packet switching apparatus. The optical packet switching apparatus includes: a network branching unit configured to branch off a network optical packet signal fed from another optical packet switching system; a client optical delay unit configured to delay the client optical packet signal fed from the packet transmitting apparatus; a network optical delay unit configured to delay one of the branched-off network optical packet signals branched off by the network branching unit, the network optical delay unit having a longer delay time than the client optical delay unit; an optical switch unit having a client input port for inputting the client optical packet signal fed from the client optical delay unit, a network input port for inputting the network optical packet signal fed from the network optical delay unit, and an output port, the optical switch unit being configured to switch the route of the inputted client optical packet signal and the network optical packet signal so as to be sent out from the output port; and an optical switch control unit configured to input the other of the branched-off network optical packet signals branched off by the network branching unit and configured to control the optical switch unit based on an analysis result of the network optical packet signal. The optical packet transmitting apparatus includes: an input buffer configured to store the received client signal; a packet generator configured to generate a client packet signal by adding a header containing packet length information to a client signal stored in the input buffer; and an output buffer configured to store the generated client packet signal and configured to convey the packet length information on a client packet signal stored in a head to the optical packet switching apparatus, wherein, when a transmission start trigger is conveyed from the switch control unit, the output buffer outputs the client packet signal; and an electrical/optical converter configured to convert the client packet signal outputted from the output buffer into a client optical packet signal and send out the converted signal to the optical packet switching apparatus. The optical switch control unit includes: a network analysis unit for detecting the time of arrival and packet length of the network optical packet signal; an output-prediction-chart generator for generating an output prediction chart that indicates a temporal location of the network optical packet signal at the output port, based on the detected arrival time and packet length thereof, wherein, when a transmittable packet length detected from the output prediction chart is greater than or equal to the packet length of the client packet signal conveyed from the optical packet transmitting apparatus, the output-prediction-chart generator conveys the transmission start trigger to optical packet transmitting apparatus; and a control signal generator for outputting a control signal to the optical switch unit in the anticipation that the client optical packet signal arrives from the optical packet transmitting apparatus after a predetermined time length passes after the transmission start trigger has been conveyed.

The network optical packet signal may be a WDM optical packet signal in which optical packet signals of multiple wavelengths have been wavelength-multiplexed, the optical switch control unit may be configured such that the free time slot is detected for each wavelength of the WDM optical packet signal, and the optical packet transmitting apparatus may adjust the transmit timing and the wavelength of the client optical packet signal in such a manner that the client optical packet signal is inserted into the detected free time slot.

An optical packet switching system may further include an optical packet receiving apparatus configured to receive the optical packet sent out from the optical switching apparatus. The optical switch unit may have a network output port for outputting the optical packet signal to the exterior of the optical packet switching system and a client output port for outputting the optical packet signal to the optical packet receiving apparatus. When a temporal competition occurs between the network optical packet signals at the network output port, the optical switch control unit may preferentially pass a network optical packet signal having arrived first and outputs a network optical packet signal having arrived later to the client output port, and the optical packet receiving apparatus may transfer the received network optical packet having arrived later, to the optical packet transmitting apparatus.

Still another embodiment of the present invention relates also to an optical packet switching system. The optical packet switching system includes: an optical packet switching apparatus configured to switch a route of an inputted optical packet signal; and an optical packet transmitting apparatus configured to generate a client optical packet signal from a received client signal and configured to send out the client optical packet signal to the optical packet switching apparatus. The optical packet switching apparatus includes: a plurality of input units configured to receive the optical packet signal; a plurality of branching units configured to branch off the optical packet signals received at the input units, respectively; a plurality of optical delay time variable units configured to vary delay time of each one of the optical packets branched-off by the branching units, respectively; an optical switch unit having a plurality of input ports for inputting the optical packet signals fed from the optical delay and a plurality of output ports, the optical switch unit being configured to switch the route of the inputted optical packet signals so as to be sent out from the output ports; an optical switch control unit configured to input each of the other of the optical packet signals branched off by the branching units, respectively, and configured to control the optical switch unit based on an analysis result of the optical packet signals; and a delay time control unit configured to control the delay time of each of the optical delay time variable units individually, wherein, when the client optical packet signal is inputted from the optical packet transmitting apparatus to the delay time variable unit, the delay time control unit controls the delay time to a first predetermined delay time, and when the network optical packet signal is inputted from another optical packet switching system, the delay time control unit controls the delay time to a second predetermined time, which is longer than the first predetermined delay time. The optical switch control unit is configured such that a free time slot, during which no network optical packet signal is sent out from the output port, is detected. The optical packet transmitting apparatus adjusts transmit timing, with which the client optical packet signal is sent out, in such a manner that the client optical packet signal is inserted into the free time slot.

Each of the optical delay time variable units may include: a client optical delay unit for delaying the optical packet signal by the first delay time; a network optical delay unit for delaying the optical packet signal by the second delay time; and a delay selective optical switch for selectively switching the kind of optical delay unit through which the optical packet signal passes between the client optical delay unit and the network optical delay unit.

The optical packet switching apparatus may further include a plurality of input selective optical switch each configured to selectively switch the kind of optical packet signals inputted to the input units between the client optical packet signal and the network optical packet signal.

The optical packet switching apparatus may further include an output selective optical switch configured to switch an output destination of an optical packet signal between the exterior of the optical packet switching system and an optical packet receiving apparatus of the optical packet switching system.

Optional combinations of the aforementioned constituting elements, and implementations of the invention in the form of methods, apparatuses, systems, programs, recording media storing the programs and so forth may also be practiced as additional modes of the present invention.

BRIEF DESCRIPTION OF THE DRAWINGS

Embodiments will now be described by way of examples only, with reference to the accompanying drawings which are meant to be exemplary, not limiting, and wherein like elements are numbered alike in several Figures in which:

FIG. 7A to 7C represent a diagram by which to explain operations of the optical packet transmitting apparatus shown in FIG. 5;

FIG. 9 illustrates an example of header format when a packet signal is divided into variable-length parts;

FIG. 18 illustrates an example of header format in the embodiment described in conjunction with FIG. 17A to 17C;

DETAILED DESCRIPTION OF THE INVENTION

The invention will now be described by reference to the preferred embodiments. This does not intend to limit the scope of the present invention, but to exemplify the invention.

Optical packet switching systems according to embodiments of the present invention will be described with reference to the drawings.

Figure 1:
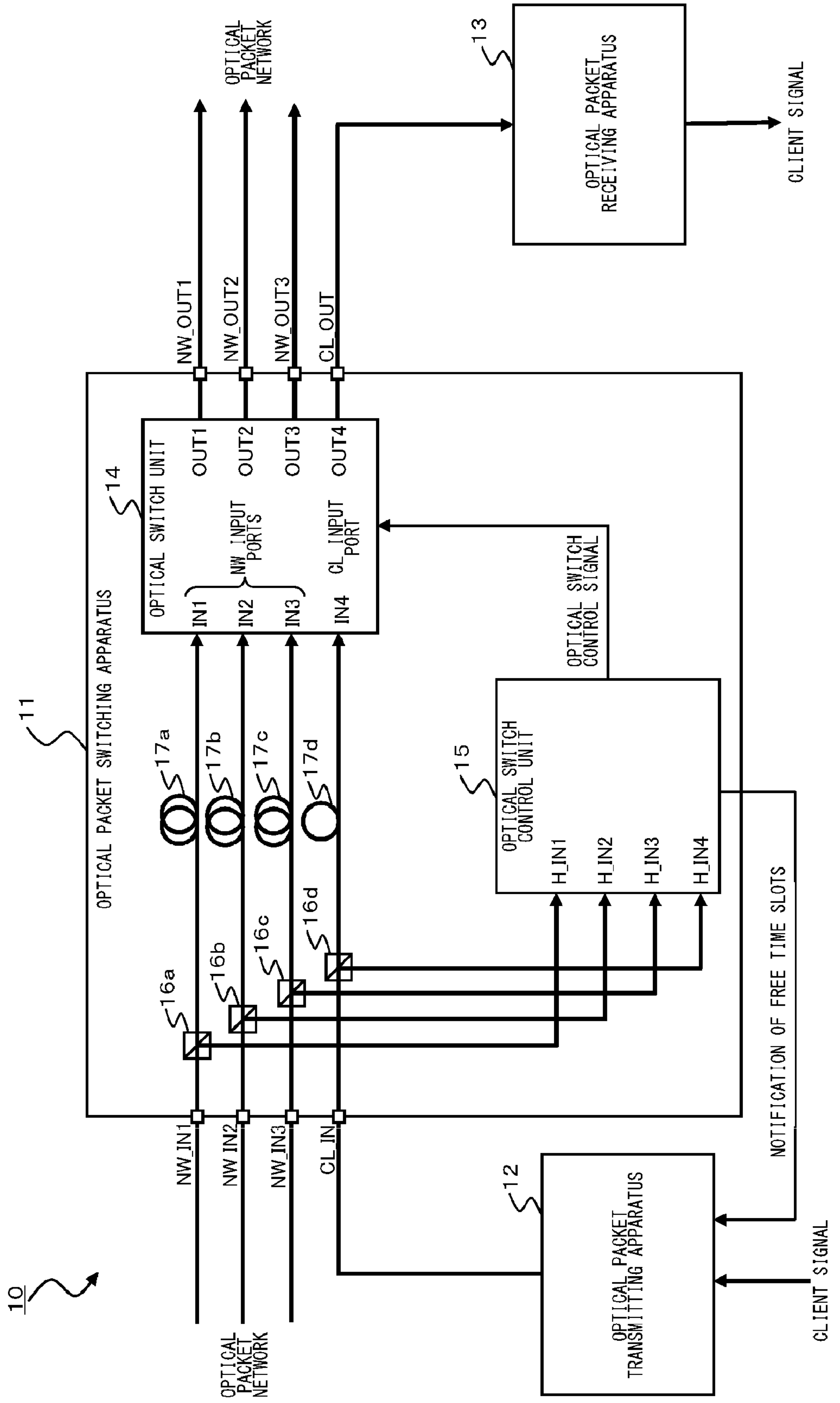
FIG. 1 illustrates an optical packet switching system according to an embodiment of the present invention.

FIG. 1 shows an optical packet switching system 10 according to an embodiment of the present invention. As shown in FIG. 1, an optical packet switching system 10 includes an optical packet switching apparatus 11, an optical packet transmitting apparatus 12, and an optical packet receiving apparatus 13.

The optical packet switching apparatus 11 according to the present embodiment is an optical packet switching apparatus with four inputs and four outputs. The optical packet switching apparatus 11 extracts destination information from an optical packet inputted from a client side or a network side. Then the optical packet switching apparatus 11 switches the route of the optical packet signal according to the destination information.

As shown in FIG. 1, the optical packet switching apparatus 11 includes an optical switch unit 14, an optical switch control unit 15, first to fourth optical branching unit 16*a* to 16*d*, first to fourth optical delay units 17*a* to 17*d*, first to third network input units NW_IN1 to NW_IN3, a client input unit CL_IN, first to third network output units NW_OUT1 to NW_OUT3, and a client output unit CL_OUT.

Optical packet signals (hereinafter referred to as "network optical packet signals" as appropriate) are inputted from an optical packet network to the first to third network input units NW_IN1 to NW_IN3, respectively. The network optical packet signal is optical packet signal(s) transmitted from the other optical packet switching system(s) 10 connected to the optical packet switching system 10. Also, an optical packet signal (hereinafter referred to as "client optical packet signal" as appropriate) is inputted from the optical packet transmitting apparatus 12 to the client input unit CL_IN.

Each optical packet signal inputted is branched off into two by the first to fourth optical branching units 16*a* to 16*d*. One of the branched-off optical packet signals is inputted to each of the first to fourth optical delay unit 17*a* to 17*d*. Each of the optical delay units, which accommodates an optical fiber having a predetermined length, causes a delay in an optical packet signal passing therethrough, according to the length of the optical fiber. The first to third optical delay units 17*a* to 17*c* are each hereinafter referred to as "network optical delay unit", and the fourth optical delay unit 17*d* to which the client optical packet signal is inputted is hereinafter referred to as "client optical delay unit".

The other of the branched-off optical packet signals branched off by each of the first to fourth optical branching units 16*a* to 16*d* is inputted to each of first to fourth header input units H_IN1 to H_IN4 of the optical switch control unit 15. The optical switch control unit 15 converts the inputted optical packet signal into an electrical packet signal and then analyzes the header of said packet signal so as to extract the destination information therefrom. Then the optical switch control unit 15 outputs a control signal to the optical switch unit 14 so that the optical packet can be outputted to the route appropriate for the extracted destination information.

If a plurality of optical packet signals that have arrived at the optical packet switching apparatus 11 simultaneously or almost simultaneously are to be outputted to an identical output unit, the optical switch control unit 15 will determine whether to pass or discard each of the plurality of optical packet signals. For example, let us consider a case where optical packets are inputted to the first network input port NW_IN1 and the second network input port NW_IN2, respectively, and those two optical packets are to be outputted to a first output port OUT1. In this case, the optical switch control unit 15 determines whether the two optical packet signals are in competition with each other or not. In other words, the optical switch control unit 15 determines whether the two optical packet signals are overlapped with each other in time or not. If the two optical packet signals are competing with each other, then the optical switch control unit 15 will pass the optical packet signal having arrived earlier and discard the one having arrived later. That is, the optical packet signal that has arrived earlier is preferentially passed. Such a determination as this is called "output competition determination".

The optical switch unit 14, which is an optical switch with four inputs and four outputs, has first to fourth input ports IN1 to IN4 and first to fourth output ports OUT1 to OUT4. Optical packet signals having passed the first to fourth optical delay units 17*a* to 17*d* are inputted to the first to fourth input ports IN1 to IN4, respectively. Hereinafter, the input ports IN1 to IN3 to which the network optical packet signals are inputted will be referred as "network input ports" as appropriate, and the input port IN4 to which the client optical packet signal is inputted will be referred to as "client input port" as appropriate.

The optical packet signals outputted from the first to third output ports OUT1 to OUT3 of the optical switch unit 14 are sent out to the optical packet network from the first to third network output units NW_OUT1 to NW_OUT3, respectively. Also, the optical packet signal outputted from the fourth output port OUT4 is sent out to the optical packet receiving apparatus 13 from the client output unit CL_OUT.

The optical switch unit 14 is constituted by a plurality of optical gate switches and a plurality of optical couplers. The optical gate switch may be one using a semiconductor optical amplifier. Alternatively, the optical gate switch may be one using PLZT (a thin film of lead zirconate titanate (PZT) doped with lanthanum) or the like. The optical switch unit 14 switches on/off each optical gate switch by the optical switch control signal from the optical switch control unit 15, also switches the route of the inputted optical packet signal, and then outputs the optical packet signal.

The aforementioned first to fourth optical delay units 17*a* to 17*d* are provided in order to buy some time so that the optical switch control unit 15 can generate the optical switch control signal. One of the branched-off optical packet signals is delayed by each of the first to fourth optical delay units 17*a* to 17*d*, so that the switching of the optical switch unit 14 can be controlled in time with the transmit timing with which the optical packet signal arrives at the optical switch unit 14.

In the optical packet switching apparatus 11 according to the present embodiment, the delay time of the first to third optical delay units 17*a* to 17*c*, which are the network optical delay units, is longer than the delay time of the fourth optical delay unit 17*d*, which is the client optical delay unit. In other words, the optical fiber length of the first to third optical delay units 17*a* to 17*c* is longer than the optical fiber length of the fourth optical delay unit 17*d*. Thus, in the optical switch control unit 15, the network optical packet signals can be first analyzed. Note that the delay time of each of the first to third optical delay units 17*a* to 17*c* is set to the same value.

The optical packet transmitting apparatus 12 adds a header, which contains the destination information and the packet length information, to the client signal (e.g., 10 GEther packet) received from the client side, and generates an optical packet signal (client optical packet signal). Then the optical packet transmitting apparatus 12 sends out the thus generated client optical packet signal to the client input unit CL_IN of the optical packet switching apparatus 11.

The optical packet receiving apparatus 13 receives the optical packet signal sent out from the client output unit CL_OUT of the optical packet switching apparatus 11. The optical packet receiving apparatus 13 generates a client signal by performing such predetermined processings as the removal of the header from the optical packet signal, and sends out the thus generated client signal to the client side.

FIG. 2A to 2F represent a diagram by which to explain operations of an optical packet switching system according to an embodiment of the present invention. The horizontal axis in FIGS. 2A to 2F is a time axis.

Figures 2A, 2B, 2C, 2D, 2E, 2F:
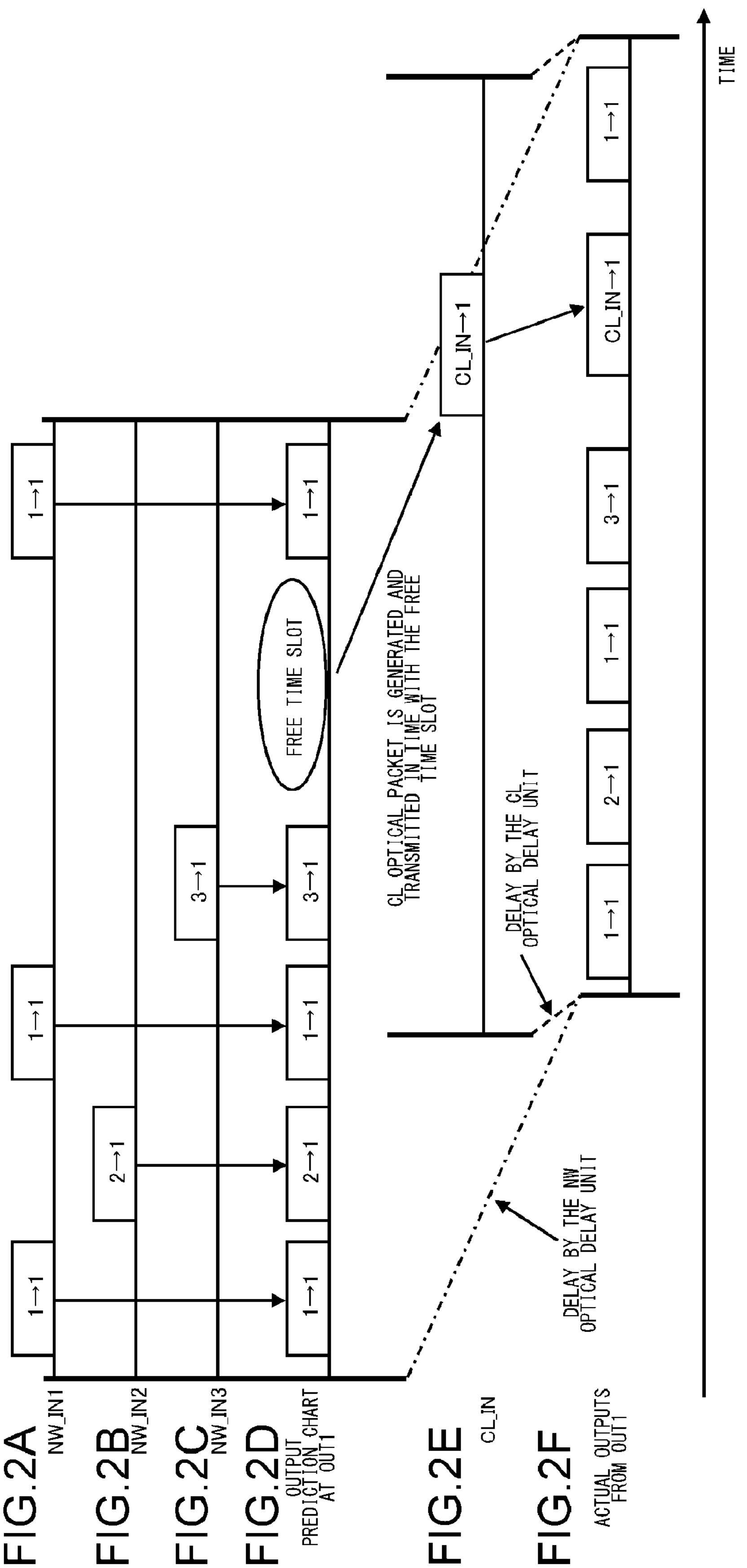
FIG. 2A to 2F represent a diagram by which to explain operations of an optical packet switching system according to an embodiment of the present invention.

FIGS. 2A to 2C show network optical packet signals inputted to the first to third network input units NW_IN1 to NW_IN3 of the optical packet switching apparatus 11, respectively. Note that the notation "2→1" placed for the optical packet signal, for instance, indicates that the optical packet signal is inputted through the second network input unit NW_IN2 and outputted to the first output port OUT1 of the optical switch unit 14. Here, a description will be given only of the optical packet signal which is outputted to the first output port OUT1 for ease of explanation.

FIG. 2D shows an output prediction chart of network optical packet signals at the first output port OUT1 of the optical packet switching apparatus 11. This output prediction chart is produced by the optical switch control unit 15 based on the time of arrival of the network optical packet signals inputted to the first to third network input units NW_IN1 to NW_IN3 and the destination information and the packet length information contained in the header. The output prediction chart shows the temporal location of the network optical packet signals at the output port. As shown in FIG. 2D, time slots for output are allotted to the network optical packet signals in the order of arrival at the optical packet switching apparatus 11. When there is temporally any competition among a plurality of network optical packet signals, the time slot is allotted preferentially to the network optical packet signal having arrived first, and the network optical packet signal having arrived later is discarded.

The optical switch control unit 15 detects a free time slot without the presence of any network optical packet signal from the output prediction chart thus produced. In the free time slot, no network optical packet signal is sent out from the output port. And the optical switch control unit 15 sends the information on the free time slot to the optical packet transmitting apparatus 12.

FIG. 2E shows a client optical packet signal inputted to the client input unit CL_IN. Upon receipt of the information on the free time slot, the optical packet transmitting apparatus 12 adjusts the transmit timing of the client optical packet signal so that the client optical packet signal may be inserted into the free time slot. More specifically, the optical packet transmitting apparatus 12 keeps the packet signal in a state of an electrical signal and then generates and sends out the client optical packet signal in time with the free time slot.

FIG. 2F shows the actual outputs from the first output port OUT1. In FIGS. 2A to 2F, the dashed-dotted lines indicate a delay caused by the network optical delay unit, and the dashed lines indicates a delay caused by the client optical delay unit. As shown in FIGS. 2A to 2F, the delay time created by the client optical delay unit is shorter than the delay time created by the network optical delay unit. Accordingly, even if a client optical packet signal is sent out after the detection of a free time slot between network optical packet signals, the client optical packet signal will be inserted into the free time slot between the network optical packet signals and sent out from the first output port OUT1.

The above description has dealt with optical packet signals which are outputted from the first output port OUT1. However, an identical processing is applied to the optical packet signals which are outputted from the second to fourth output ports OUT2 to OUT4 also.

Since the network optical packet signals are the optical packet signals sent from the other optical packet switching systems, their time of arrival at the optical packet switching apparatus 11 cannot be controlled. However, since the client optical packet signals are the optical packet signals generated by the optical packet transmitting apparatus 12 within the optical packet switching system 10, the generation and transmission timing of the optical packet signals can be determined arbitrarily. Thus, in the present embodiment, the arrangement is such that an attempt to detect a free time slot without the presence of any network optical packet signal is constantly made within the optical packet switching apparatus 11 and a client optical packet signal is sent out from the optical packet transmitting apparatus 12 when the free time slot is detected. As a result, a temporal competition between the network optical packet signal and the client optical packet signal in the optical packet switching apparatus 11 is avoided, so that the discarding rate of optical packet signals can be reduced.

As mentioned above, a client optical packet signal can be inserted into a free time slot even if the client optical packet signal is sent out after the detection of the free time slot between network optical packet signals. This is because the delay time created by the network optical delay unit is longer than the delay time created by the client optical delay unit. A proper delay time difference, which can vary with the circuit structure and the like, may be set as appropriate through experiments, simulation runs, and so forth.

Figure 3:
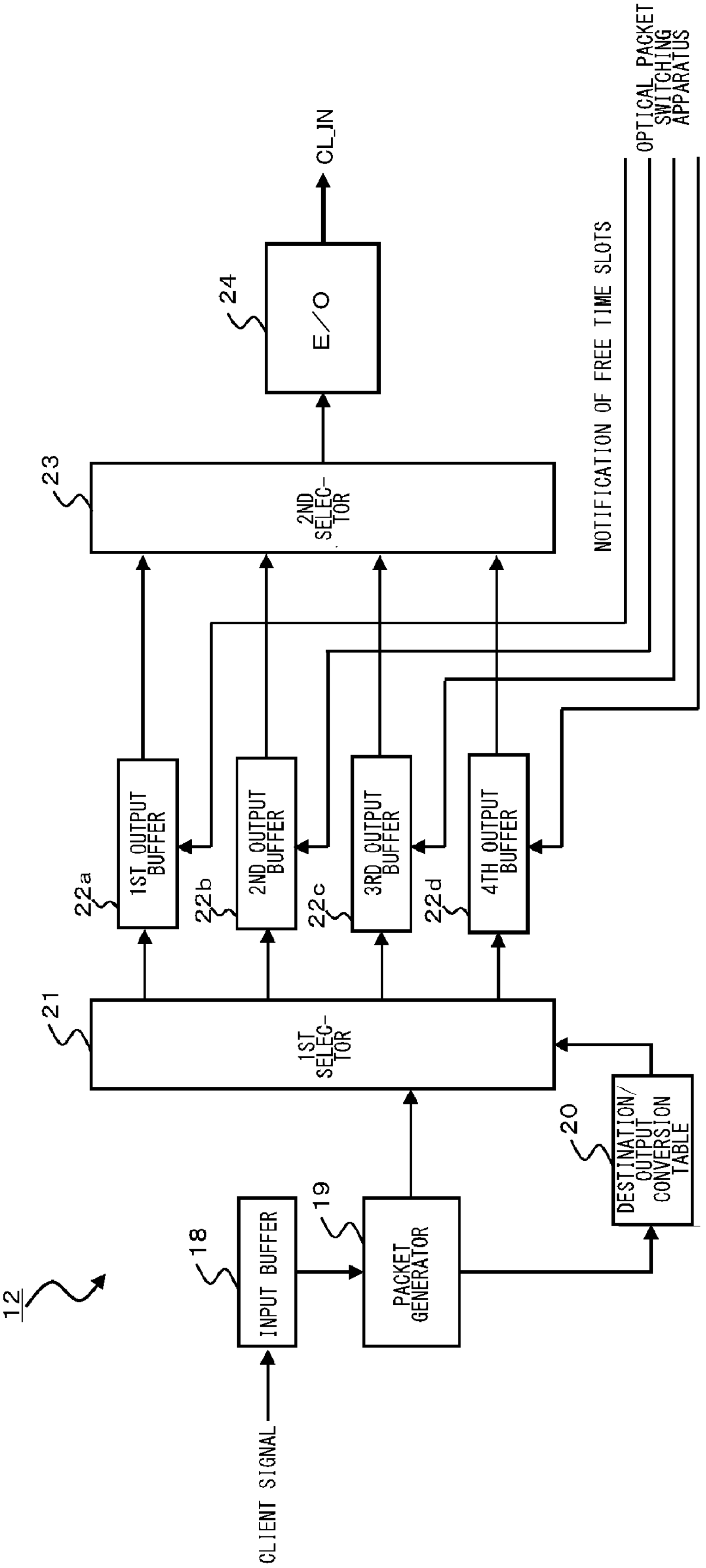
FIG. 3 illustrates an optical packet transmitting apparatus according to an embodiment of the present invention.

FIG. 3 illustrates the optical packet transmitting apparatus 12 according to an embodiment of the present invention. As shown in FIG. 3, the optical packet transmitting apparatus 12 includes an input buffer 18, a packet generator 19, a destination/output conversion table 20, a first selector 21, first to fourth output buffers 22*a* to 22*d*, a second selector 23, and an electrical/optical (E/O) converter 24.

The input buffer 18 stores the client signal received from the client side. The packet generator 19 extracts the destination information from the client signal stored in the input buffer 18, and generates an electrical client packet signal by adding a header, containing those pieces of information, to the client signal. The thus generated client packet signal is sent to the first selector 21.

Also, the packet generator 19 determines to which output unit of the optical packet switching apparatus 11 the client optical packet signal be outputted, based on the extracted destination information and the destination/output conversion table 20. According to the determination made thereby, the first selector 21 transfers the client packet signal to any one of the first to fourth output buffers 22*a* to 22*d*.

The first to fourth buffers 22*a* to 22*d* are output buffers provided for the first to fourth output ports OUT1 to OUT4 of the optical switch unit 14, respectively. The first to fourth output buffers 22*a* to 22*d* are each a first-in-first-out (FIFO) buffer where the electrical client optical packets transferred from the first selector 21 are accumulated.

Also, the transmittable timings and transmittable packet lengths of the client optical packet signals are conveyed from the optical switch control unit 15 to the first to fourth output buffers 22*a* to 22*d*, respectively, as free time slot information. If the packet length of the client packet signal stored in a head is shorter than or equal to the transmittable packet lengths notified, the first to fourth output buffers 22*a* to 22*d* will output the client packet signal in time with the transmittable timings notified. The client packet signals outputted from the first to fourth output buffers 22*a* to 22*d* are time-multiplexed by the second selector 23 and then converted into client optical packet signals by the electrical/optical converter 24 so as to be sent out to the client input unit CL_IN of the optical packet switching apparatus 11.

Here, if the time length, which has elapsed between the receiving of free time slot information from the optical switch control unit 15 and the actual output of client optical packet signal, varies, the temporal relation, at the time when the client optical packet signal and the network optical signal join together at the optical packet switching apparatus 11, will fall apart. Thus, the time length that has elapsed therebetween must be accurately constant. For this reason, the configuration may be such that the optical switch control unit 15 and the optical packet transmitting apparatus 12 operate on a synchronous clock.

Figures 4A, 4B, 4C:
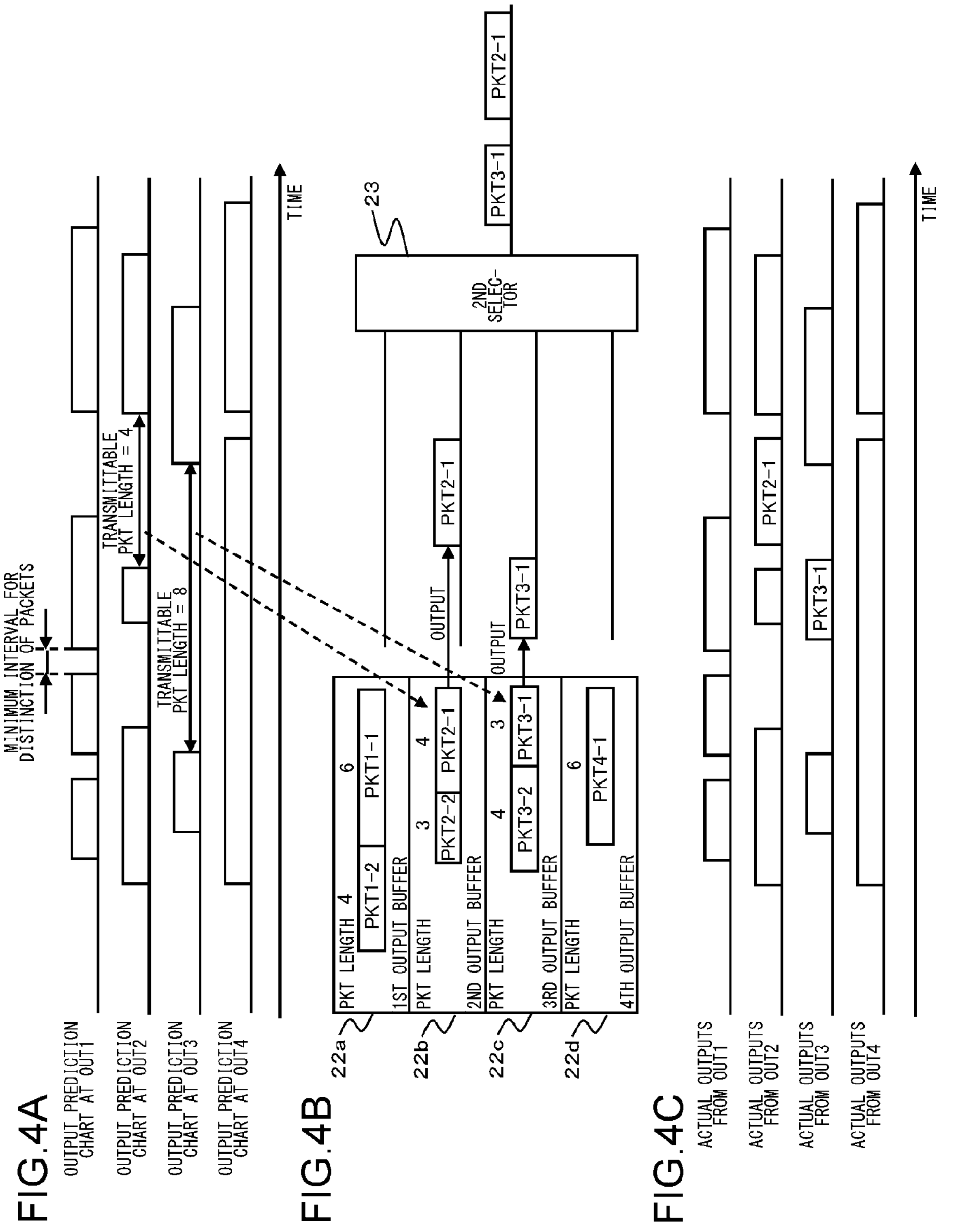
FIG. 4A to 4C represent a diagram by which to explain operations of the optical packet transmitting apparatus shown in FIG. 3.

FIG. 4A to 4C represent a diagram by which to explain operations of the optical packet transmitting apparatus shown in FIG. 3.

FIG. 4A shows an output prediction chart of the first to fourth output ports OUT1 to OUT4 of the optical switch unit 14 prepared by the optical switch control unit 15. As described above, the optical switch control unit 15 creates an output prediction chart of the network optical packet signals regarding each output port of the optical switch unit 14. Then the optical switch control unit 15 detects a free time slot without the presence of any network optical packet, from the thus created output prediction chart. Then, the optical switch control unit 15 conveys the transmittable timings of the client optical packet signals and the transmittable packet lengths to the first to fourth output buffers 22*a* to 22*d*, as free time slot information. FIG. 4A shows, as an example, a free time slot of "transmittable packet (PKT) length=4" in the output prediction chart at the second output port OUT2 and a free time slot of "transmittable packet (PKT) length=8" in the output prediction chart at the third output port OUT3. Note the value of packet length shown here may be represented in an arbitrary unit.

In the optical packet switching scheme, there is generally provided a gap having a predetermined minimum interval or more between adjacent optical packets. There are two reasons why this gap is provided. The first reason is that the gap is provided in order that a distinction can be made between a preceding optical packet signal and a subsequent optical packet signal and thereby the synchronization of the subsequent optical packet can be established. In the optical packet switching scheme, it is possible that the inputted optical packet signals may be those outputted from the different optical packet switching systems. Thus, even though the signals come in the successive optical packet signals, the clock needs to be extracted for each of the successive optical packets. In order to do so, a state where there is no optical packet signals needs to exist. The second reason is the following. That is, when the route is switched by the optical switch unit for each packet, a loss varies during a transitional period of time when the switching is done by the optical switch unit. If this loss varies, the optical packet signals cannot be properly placed. Thus, the optical switch control unit 15 detects a gap, which is greater than or equal to the predetermined minimum interval, as a free time slot.

FIG. 4B shows an operation of the optical packet transmitting apparatus 12 that has received the free time slot information. In FIG. 4B, the notations "PKT1-1" and "PKT1-2" appended to the client packet signal stored in each output buffer means a first client packet signal stored in the first of the first output buffer 22*a* and a second client packet signal stored in the second of the first output buffer 22*a*, respectively. In FIG. 4B, the packet (PKT) length is indicated for each client packet signal.

If the packet length of the client packet signal stored at the head is shorter than or equal to the transmittable packet length conveyed, the first to fourth buffers 22*a* to 22*d*, which have received the free time slot information from the optical switch control unit 15, will output the client packet signals in time with the transmittable timings conveyed. For example, since the packet length of the first client packet signal PKT2-1 stored in the second output buffer 22*b* is "4", the second output buffer 22*b*, which has received the free time slot information of "transmittable packet length=4" from the optical switch control unit 15, will output the client packet signal PKT2-1 in time with the transmittable timing conveyed. Also, since the packet length of the first client packet PKT3-1 stored in the third output buffer 22*c* is "3", the third output buffer 22*c*, which has received the free time slot information of "transmittable packet length=8" from the optical switch control unit 15, will output the client packet signal PKT3-1 in time with the transmittable timing conveyed.

If the optical packet transmitting apparatus 12 has a single electrical/optical converter 24 only and a single optical output terminal only, it will be required as shown in FIG. 4B that the client packet signals from the output buffers be merged by the second selector 23 and then time-multiplexed. Since, at this time, the client optical packet signals to a plurality of output ports cannot be outputted simultaneously, each output buffer needs to output the client packet signal in consideration of not only the conveyed transmittable timing but also the output competition with the other output buffers. More specifically, if the client packet signal is being outputted from another output buffer at the very transmittable timing conveyed, each output buffer waits for a moment. Then, the client packet signal will be outputted whenever it can be inserted into a free time slot thereafter.

FIG. 4C shows actual outputs from the first to fourth output ports OUT1 to OUT4 of the optical switch unit 14. Similar to the network optical packet signal, the optical packet switching apparatus 11, which has received the client optical packet signal, switches the route of the client optical packet signal. In FIG. 4C, the client optical packet signal PKT2-1 is inserted into a free time slot of the second output port OUT2, whereas the client optical packet signal PKT3-1 is inserted into a free time slot of the third output port OUT3.

Figure 5:
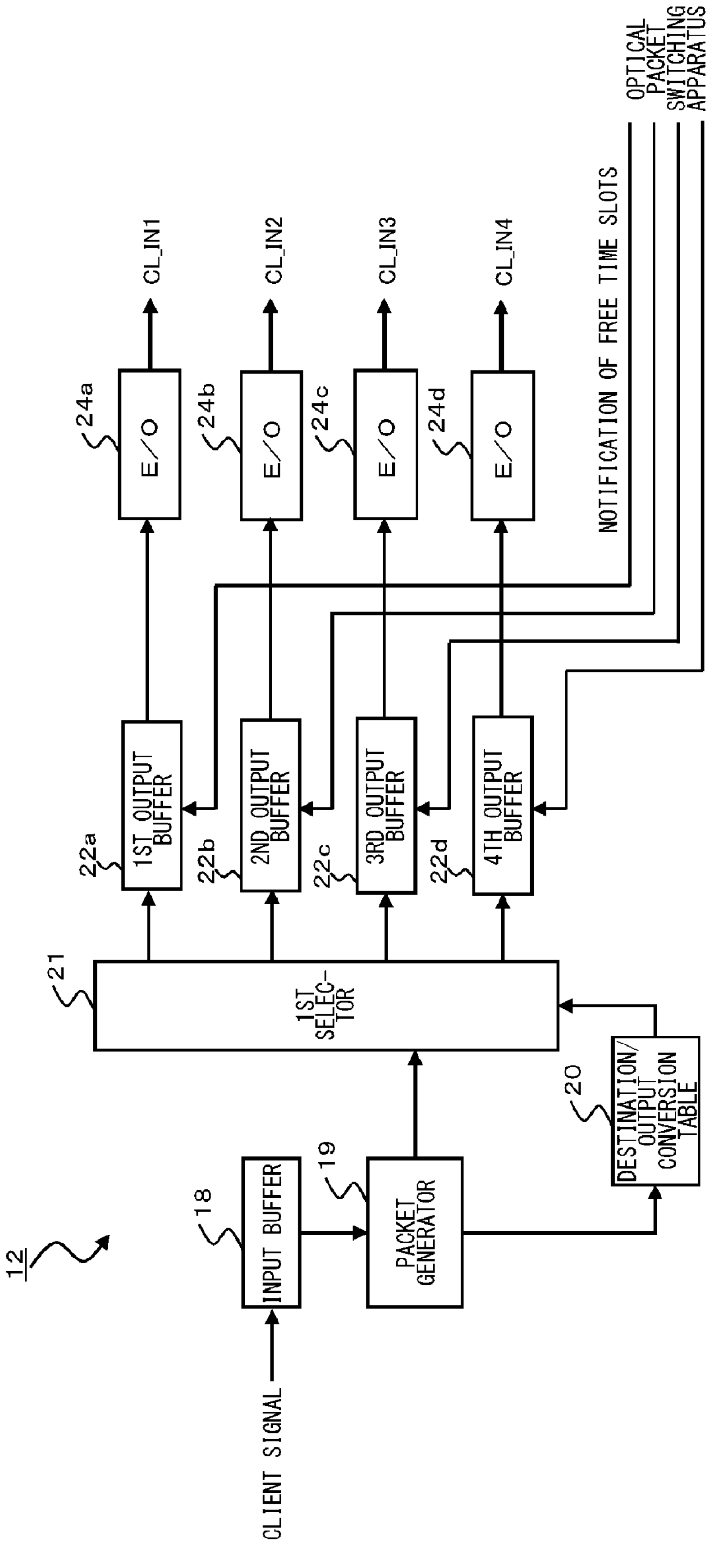
FIG. 5 illustrates an optical packet transmitting apparatus according to another embodiment of the present invention.

FIG. 5 illustrates an optical packet transmitting apparatus according to another embodiment of the present invention. The optical packet transmitting apparatus 12 according to the present embodiment resolves the aforementioned problem where the client optical packet signals to a plurality of output ports cannot be outputted simultaneously. Components of the optical packet transmitting apparatus 12 according to the present embodiment which are identical to or correspond to those of the optical packet transmitting apparatus shown in FIG. 3 are given the same reference numerals herein and the repeated description thereof are omitted as appropriate.

Figure 15:
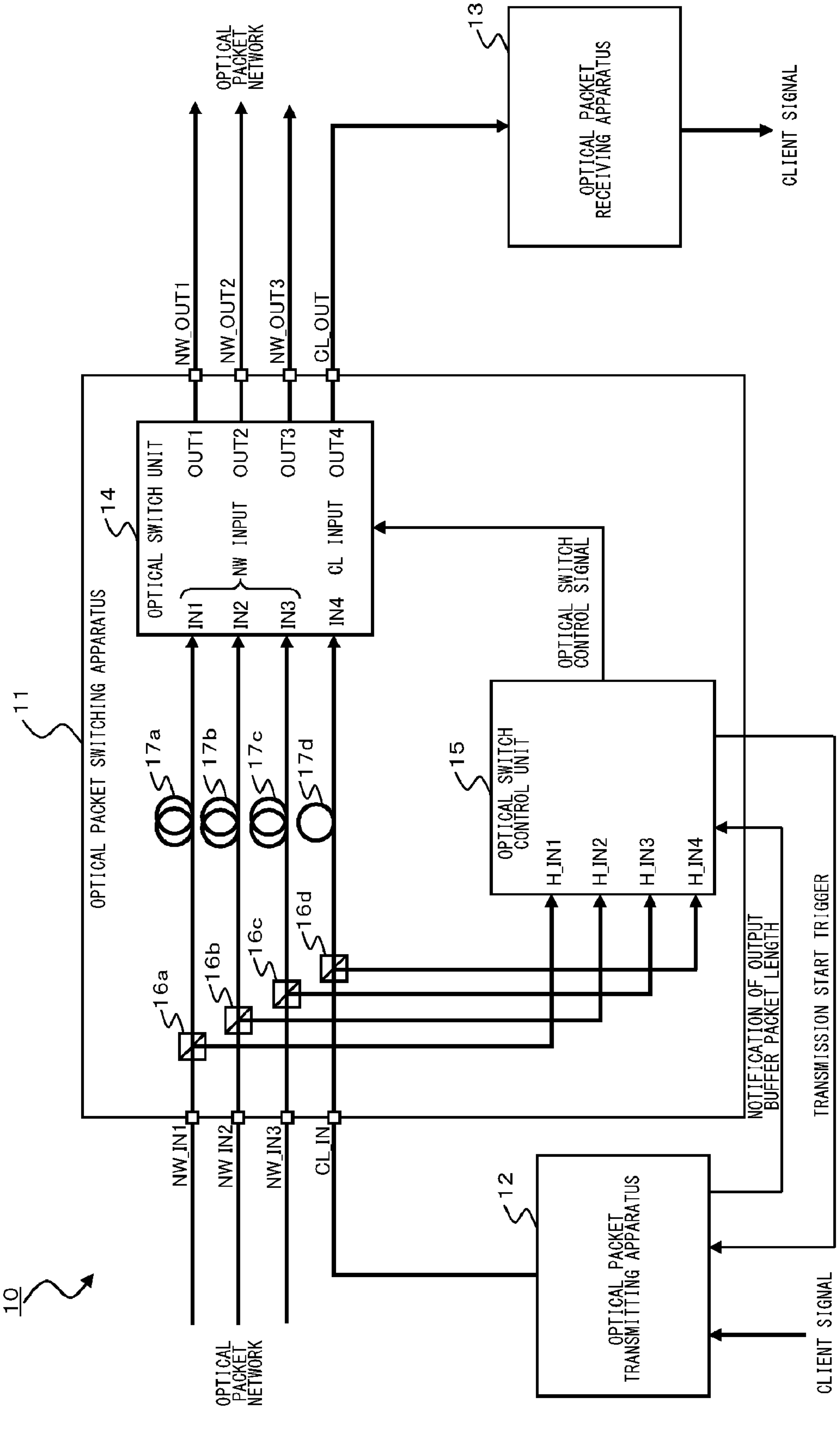
FIG. 15 illustrates an optical packet switching system according to another embodiment of the present invention.

The optical packet transmitting apparatus 12 of FIG. 5 is characterized by the feature that it is provided with electrical/optical converters the number of which is equal to the number of output ports of the optical switch unit 14. As shown in FIG. 15, the optical packet transmitting apparatus 12 includes first to fourth electrical/optical converters 24*a* to 24*d*, and the optical packet transmitting apparatus 12 according to the present embodiment differs from that of FIG. 3 in that the client packet signals are directly outputted from the first to fourth output buffers 22*a* to 22*d* to the first to fourth electrical/optical converters 24*a* to 24*d*. The client packet signals inputted to the first to fourth electrical/optical converters 24*a* to 24*d* are converted into client optical packets by the first to fourth electrical/optical converters 24*a* to 24*d*, respectively, so as to be outputted to the optical packet switching apparatus.

Figure 6:
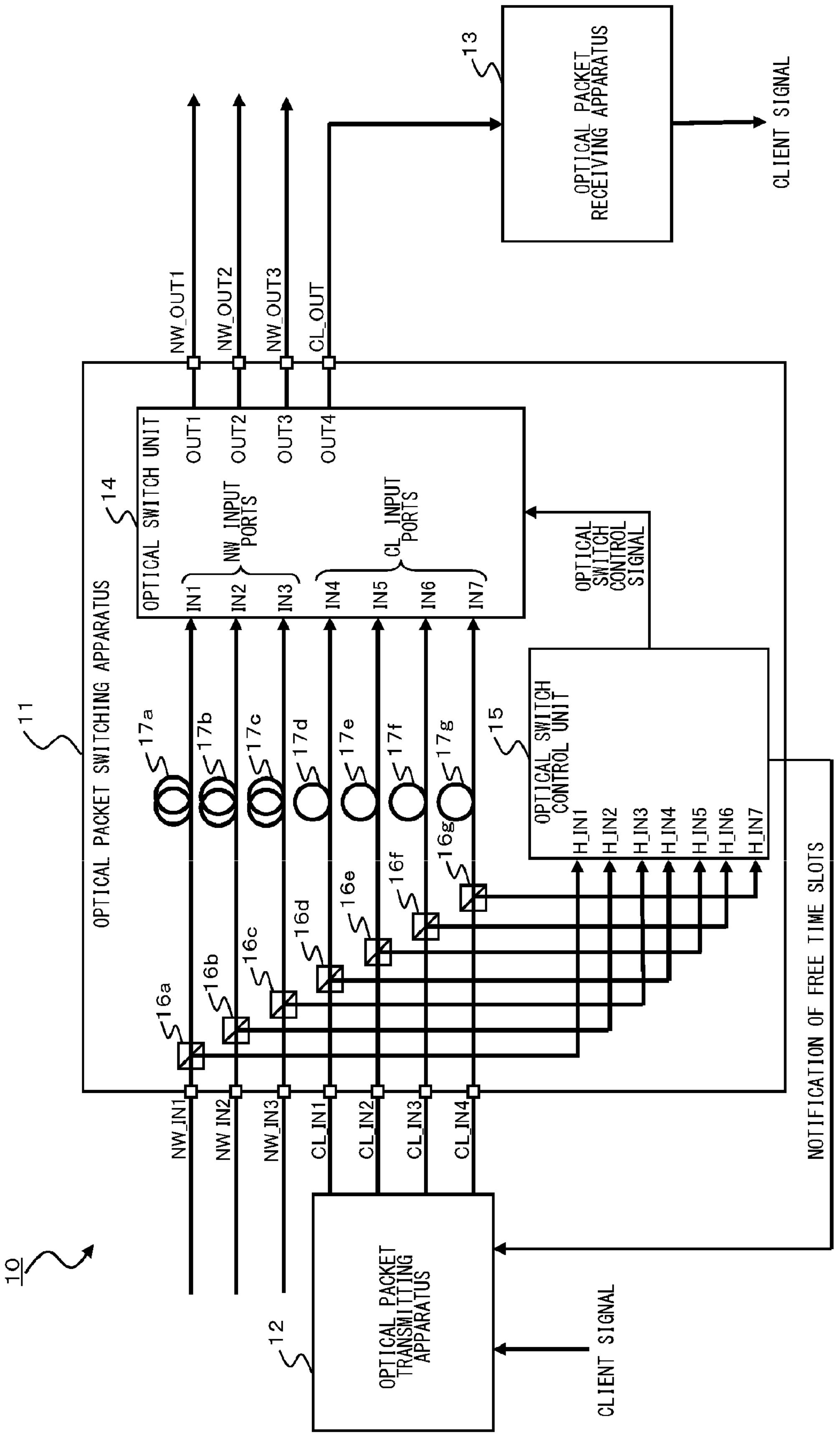
FIG. 6 illustrates an optical packet switching system where the optical packet transmitting apparatus shown in FIG. 5 is employed.

FIG. 6 illustrates an optical packet switching system where the optical packet transmitting apparatus shown in FIG. 5 is employed. Components of the optical packet switching system according to the present embodiment which are identical to or correspond to those of the optical packet switching system shown in FIG. 1 are given the same reference numerals herein and the repeated description thereof are omitted as appropriate.

The optical packet switching apparatus 11 of the optical packet switching system 10 shown in FIG. 6 is provided with first to fourth client input units CL_IN1 to CL_IN4 to which the client optical packet signals fed from the first to fourth output buffers 22*a* to 22*d* of the optical packet transmitting apparatus 12 are inputted.

Also there are provided fourth to seventh optical branching units 16*d* to 16*g* for the first to fourth client input units CL_IN1 to CL_IN4, respectively, and fourth to seventh optical delay units 17*d* to 17*g* to each of which one of the client packet signals branched off by the fourth to seventh optical branching units 16*d* to 16*g* is inputted.

The delay time of the fourth to seventh optical delay units 17*d* to 17*g*, which are the client optical delay units, is shorter than the first to third optical delay units 17*a* to 17*c*, which are the network optical delay units. The optical packet signals delayed by the fourth to seventh optical delay units 17*d* to 17*g* are inputted to the fourth to seventh input ports of the optical switch unit 14, respectively. The fourth to seventh input ports are client input ports.

Also, the others of client packet signals branched off by the fourth to seventh optical branching units 16*d* to 16*g* are inputted to fourth to seventh header input units H_IN4 to H_IN7 of the optical switch control unit 15, respectively.

FIG. 7A to 7C represent a diagram by which to explain operations of the optical packet transmitting apparatus shown in FIG. 5. FIG. 7A shows an output prediction chart of the first to fourth output ports OUT1 to OUT4 of the optical switch unit 14 prepared by the optical switch control unit 15. FIG. 7A shows, as an example, a free time slot of "transmittable packet length=4" in the output prediction chart at the second output port OUT2 and a free time slot of "transmittable packet length=8" in the output prediction chart at the third output port OUT3.

FIG. 7B shows an operation of the optical packet transmitting apparatus 12 that has received the free time slot information. If the packet length of the client packet signal stored in the head is shorter than or equal to the transmittable packet lengths notified, the first to fourth output buffers 22*a* to 22*d* of the optical packet transmitting apparatus 12 that has received the free time slot information will output the client packet signal in time with the transmittable timings notified. For example, since the packet length of the first client packet signal PKT2-1 stored in the second output buffer 22*b* is "4", the second output buffer 22*b*, which has received the free time slot information of "transmittable packet length=4" from the optical switch control unit 15, will output the client packet signal PKT2-1 in time with the transmittable timing conveyed. Also, since the packet length of the first client packet PKT3-1 stored in the third output buffer 22*c* is "3", the third output buffer 22*c*, which has received the free time slot information of "transmittable packet length=8" from the optical switch control unit 15, will output the client packet signal PKT3-1 in time with the transmittable timing conveyed.

Here, the optical packet transmitting apparatus 12 of FIG. 5 is provided with the first to fourth electrical/optical converters 24*a* to 24*d* provided in parallel with each other. Thus, the first to fourth output buffers 22*a* to 22*d* can output the client packet signals simultaneously. FIG. 7B shows how the client packet signals PKT2-1 and PKT3-1 are being outputted in a state where they are overlapped with each other in time.

FIG. 7C shows actual outputs from the first to fourth output ports OUT1 to OUT4 of the optical switch unit 14. As shown in FIG. 7C, according to the present embodiment, the client optical packet signals PKT2-1 and PKT3-1 can be sent out from the second output port OUT2 and the third output port OUT3 of the optical switch unit 14, respectively, in a state where PKT2-1 and PKT3-1 are overlapped with each other in time. Thereby, the client optical packet signal PKT3-2 can be dispatched early as compared with the case of FIG. 4, so that a second client optical packet signal PKT3-2 can be inserted into a remaining free time slot. In this manner, the bandwidth usage efficiency can be enhanced by employing the present embodiment.

The configuration as shown in FIG. 5 and FIG. 6 requires a plurality of electrical/optical converters and therefore the number of input ports in the optical switch unit 14 needs to be increased. Thus, it is preferable that the configuration of FIG. 1 and FIG. 3 be employed if the cont is to be emphasized, whereas the configuration of FIG. 5 and FIG. 6 be employed if the bandwidth usage efficiency is to be emphasized.

FIG. 8A to 8D represent a diagram by which to explain another operations of the optical packet transmitting apparatus. In FIGS. 4A to 4D, if the packet length of the client packet signal stored at the head is shorter than or equal to the transmittable packet length conveyed, the first to fourth buffers 22*a* to 22*d* will output the client packet signal. In this case, if a client optical packet signal to be transmitted is rather long, this signal may not be transmitted as quickly as it should be and therefore the packet may be lost due to overflow in the output buffers.

Thus, if the packet length of a client packet signal is longer than the transmittable packet length, this client packet signal may be divided into a plurality of parts, each of whose packet length is shorter than or equal to the transmittable packet length, so as to be outputted.

Figures 8A, 8B, 8C, 8D:
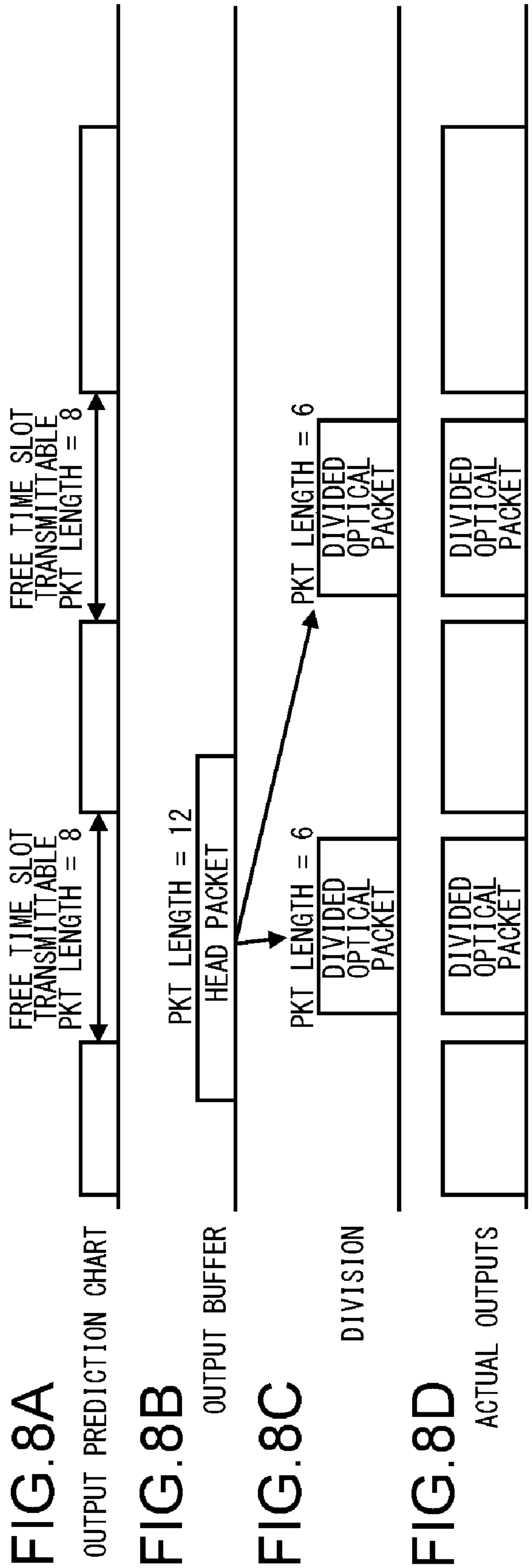
FIG. 8A to 8D represent a diagram by which to explain another operations of an optical packet transmitting apparatus.

FIG. 8A shows an output prediction chart at an output port of the optical switch unit 14. FIG. 8B shows a state of the output buffer of the optical packet transmitting apparatus 12 corresponding to the above output port. FIG. 8C shows a state where a client optical packet signal is divided. And FIG. 8D shows actual outputs from the output port.

Let us assume that, as shown in FIG. 8A, two first free time slots of transmittable packet length=8 each have been detected from the output prediction chart. Since the packet length of the client packet signal at the head is "12" and is longer than the transmittable packet length conveyed, the output buffer of the optical packet transmitting apparatus 12 that has received the free time slot information will divide the client packet signal into halves. As a result, as shown in FIG. 8D, the divided packet signals are inserted into the two free time slots, respectively, and can be outputted from the output port of the optical switch unit 14.

Conceivable as a method for dividing the client packet signal are a method for dividing into fixed-length parts and a method for dividing into variable-length parts according to the transmittable packet length conveyed.

FIG. 9 illustrates an example of header format when the packet signal is divided into variable-length parts. As shown in FIG. 9, the header includes "destination address", "source address", "length of divided packet" which is the length after division, "divisional flag" indicating that a packet signal is a client packet signal after division, "packet identification number" by which to distinguish from other client packet signals, "order of output" from an output buffer, and "final packet flag" indicating whether a packet signal is a divided packet signal outputted last or not.

"Length of divided packet" will be required when the route of a divided optical packet signal is to be switched by the optical switch control unit 15. The output buffer of the optical packet switching apparatus 11 divides the client packet signal such that the client packet signal stored at the head is shorter than or equal to the transmittable packet length conveyed.

"Divisional flag", "packet identification number", "order of output" and "final packet flag" will be required when the divided packet signals are to be regenerated to the original client packet signal.

For "packet identification numbers", a counter may be provided in the optical packet transmitting apparatus 12 for generating the client packet signal, and the packet identification numbers may be given serially through the counter or random numbers may be given using a random number table.

"Order of output" may be such that an order-of-output counter is incremented whenever a divided packet signal is outputted and such that the order-of-output counter is reset to "0" after the "final packet flag" is enabled and the final divided packet signal has been outputted.

The optical packet receiving apparatus 13 determines whether a packet signal is a normal packet signal or a divided packet signal, based on the presence or absence of the "divisional flag". If the packet signal is a normal packet signal, this normal packet will undergo a predetermined receiving processing and then outputted to the client side. If, on the other hand, it is a divided packet signal, this divided packet signal will be stored in a receiving buffer. When the packet signal is to be divided into variable-length parts, the division number is not yet determined at the time when the packet signal is transmitted and therefore it is unknown when the data will be properly aligned or fit. Thus, the divided packet signals stored in the receiving buffer are sorted out based on the packet identification numbers. When received is a divided packet signal where the final packet flag is enabled, the order of output attached to this divided packet signal is recognized as the final number. Then those divided packet signals are rearranged so that the orders of output thereof start from 0 up to the final number in an orderly manner, and they are regenerated to the original client packet signal and outputted to the client side. If the divided packet signal having the final packet flag does not arrive after a predetermined time length has elapsed or if not all of the divided packet signals is gathered completely because one or more divided packet signal(s) whose order of output is/are between 0 and the final number (not inclusive) is/are missing, the client packet signal may be discarded. A case where the packet signal is to be divided into fixed-length parts is omitted here but a similar process to the above may be performed.

FIG. 10A to 10D represent a diagram by which to explain still another operation of the optical packet transmitting apparatus. Conceivable as still another method of output of client packet signals is a method that requires the changing of the output order of client packet signals. In this method, when the packet length of the client packet signal stored at the head is longer than the transmittable packet length notified, a client packet signal having a packet length shorter than or equal to the transmittable packet length is searched for among the client packet signals stored thereafter and the client packet signal thus found is outputted.

Figures 10A, 10B, 10C, 10D:
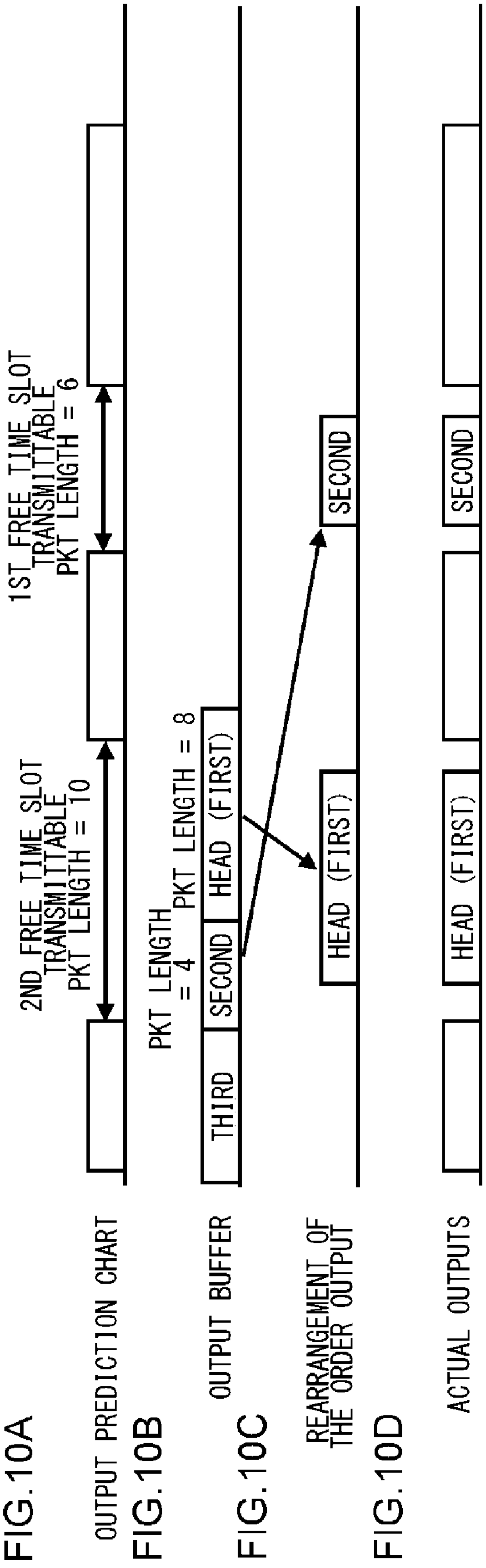
FIG. 10A to 10D represent a diagram by which to explain still another operations of an optical packet transmitting apparatus.

FIG. 10A shows an output prediction chart at an output port of the optical switch unit 14. FIG. 10B shows a state of the output buffer of the optical packet transmitting apparatus 12 corresponding to the above output port. FIG. 10C shows a changed order of outputs. And FIG. 10D shows actual outputs from the output port.

Let us assume that, as shown in FIG. 10A, a first free time slot of transmittable packet length=6 and a second free time slot of transmittable packet length=10, which is located thereafter, have been detected from the output prediction chart. Also, let us assume that, as shown in FIG. 10B, the packet length of the first client packet signal stored in the output buffer of the optical packet transmitting apparatus 12 is "8" and the packet length of the second client packet signal is "4". In this case, the output buffer searches for a client packet signal whose packet length is shorter than or equal to the transmittable packet length "6" from among the client packet signals stored after the first client packet signal because the packet length "8" of the first client packet signal is longer than the transmittable packet length "6" of the first free time slot. In this example, since the packet length of the second client packet signal is "4", the second client packet signal is outputted earlier. Then the output buffer outputs the first client optical packet signal because the first client optical packet has a packet length which is shorter than or equal to the transmittable packet length "10" of the second free time slot. As a result, as shown in FIG. 10D, the second client optical packet signal, which is inserted into the first free time slot, and the first client optical packet signal, which is inserted into the second free time slot, can be sent out from the output port of the optical switch unit 14. In this output method, too, free time slots are reduced, thus achieving further improvement in the bandwidth usage efficiency.

FIG. 11A to 11D represent a diagram by which to explain still another operation of the optical packet transmitting apparatus. When a conveyed free time slot is considerably longer than the client packet signal stored at the head and therefore the free time slot has still room with the first client optical packet signal inserted, the output buffer of the optical packet transmitting apparatus 12 may output client packet signals in succession. In this method, when the packet length of the client packet signal stored at the head is shorter than or equal to the conveyed transmittable packet length, the output buffer of the optical packet transmitting apparatus 12 searches for a client packet signal whose packet length is shorter than the difference calculated by subtracting the packet length of the first client packet signal from the transmittable packet length from among the client packet signals stored thereafter, and outputs the thus found client packet signal following the first client packet signal.

Figures 11A, 11B, 11C, 11D:
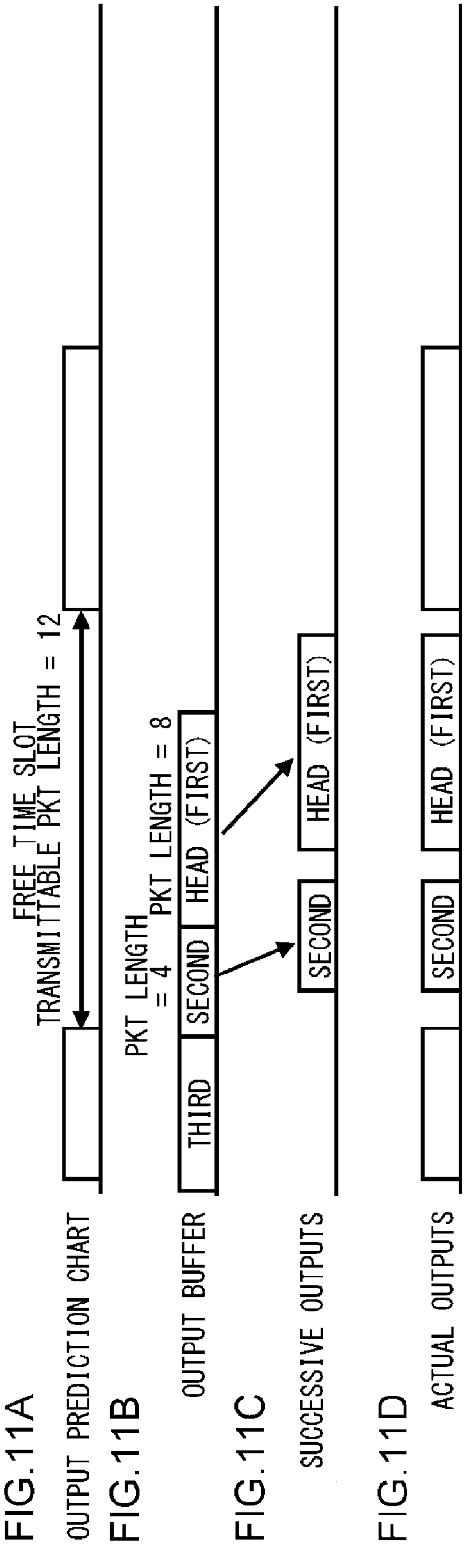
FIG. 11A to 11D represent a diagram by which to explain still another operations of an optical packet transmitting apparatus.

FIG. 11A shows a prediction chart of outputs at an output port of the optical switch unit 14. FIG. 11B shows a state of the output buffer of the optical packet transmitting apparatus 12 corresponding to the above output port. FIG. 11C shows a state of successive outputs of client packet signals. And FIG. 11D shows actual outputs from the output port.

Let us assume that, as shown in FIG. 11A, a free time slot of transmittable packet length=12 has been detected from the output prediction chart. Also, let us assume that, as shown in FIG. 11B, the packet length of the first client packet signal stored in the output buffer of the optical packet transmitting apparatus 12 is "8" and the packet length of the second client packet signal is "4". In this case, the output buffer outputs the first client packet signal first because the packet length "8" of the first client packet signal is shorter than the transmittable packet length "12" of the free time slot. Also, since there still exists a remainder of "4", which is the difference calculated by subtracting the packet length "8" of the first client packet signal from the transmittable packet length "12", the output buffer searches for a client packet signal whose packet length is shorter than or equal to "4" from among the client packet signals stored thereafter. In this example, since the packet length of the second client packet signal is "4", the second client packet signal is outputted following the first client packet signal. As a result, as shown in FIG. 11D, the first and the second client optical packet signal, which are both inserted into the free time slot, can be sent out from the output port of the optical switch unit 14. In this output method, too, free time slots will be reduced, thus achieving further improvement in the bandwidth usage efficiency.

Figure 12:
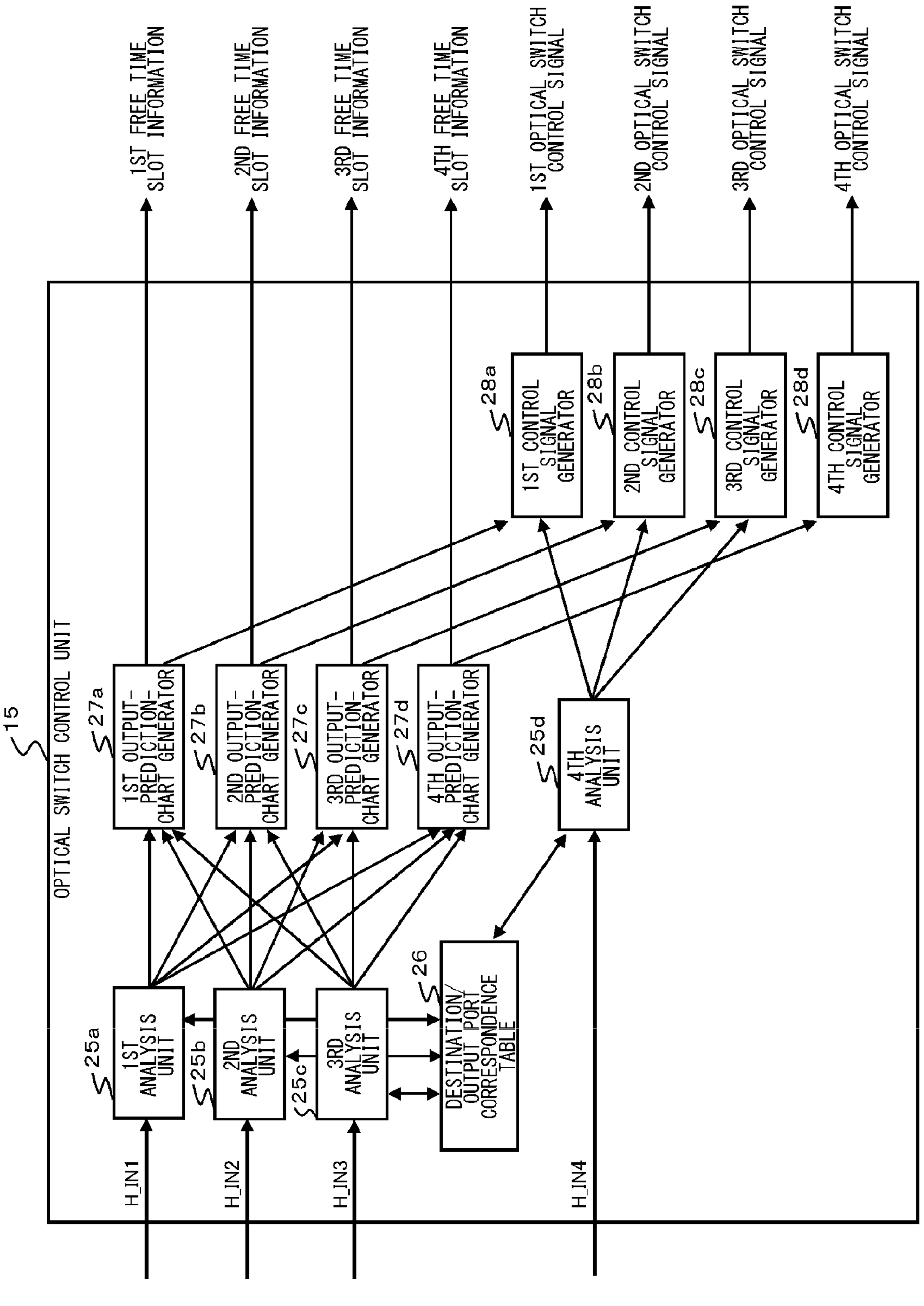
FIG. 12 is a diagram by which to explain a structure of an optical switch control unit.

FIG. 12 is a diagram by which to explain a structure of an optical switch control unit. As shown in FIG. 12, the optical switch control unit 15 includes first to fourth analysis units 25*a* to 25*d*, a destination/output port correspondence table 26, first to fourth output prediction generators 27*a* to 27*d*, and first to fourth control signal generators 28*a* to 28*d*.

As described with reference to FIG. 1, optical packet signals branched off by the first to fourth optical branching units 16*a* to 16*d* are inputted to the first to fourth header input units H_IN1 to H_IN4 of the optical switch control unit 15. The network optical packet signals inputted to the first to third header input units H_IN1 to H_IN3 are inputted to the first to third analysis units 25*a* to 25*c* (hereinafter also referred to as "network analysis units 25*a* to 25*c*" as appropriate). Also, the client optical packet signal inputted to the fourth header input unit H_IN4 is inputted to the fourth analysis unit 25*d* (hereinafter also referred to as "client analysis unit 25*d*" as appropriate).

The network analysis units 25*a* to 25*c* convert the received network optical packet signals into the electrical network packet signals and then extract the destination information and the packet length information by analyzing the headers. Then the network analysis units 25*a* to 25*c* select the output ports for the network optical packet signals to be inputted to the optical switch unit 14, using the destination/output port correspondence table 26. The destination/output port correspondence table 26, which is a correspondence table of destination addresses and output ports, indicates, for instance, that the optical packet signal to destination address 100 is to be outputted to the second output port. Note also that the network analysis units 25*a* to 25*c* record the times of arrival of the network optical packet signals.

Each of the network analysis units 25*a* to 25*c* transfers information on the time of arrival, packet length, and the like of network optical packet signals to the first to fourth output-prediction-chart generators 27*a* to 27*d*. The first to fourth output-prediction-chart generators 27*a* to 27*d* generate the output prediction chart for the first to fourth output ports OUT1 to OUT4 of the optical switch unit 14. Each of the output-prediction-chart generators calculates the temporal arrangement of network optical packet signals by superposing and combining the network optical packet signals arriving at the respective output ports.

Figures 13A, 13B:
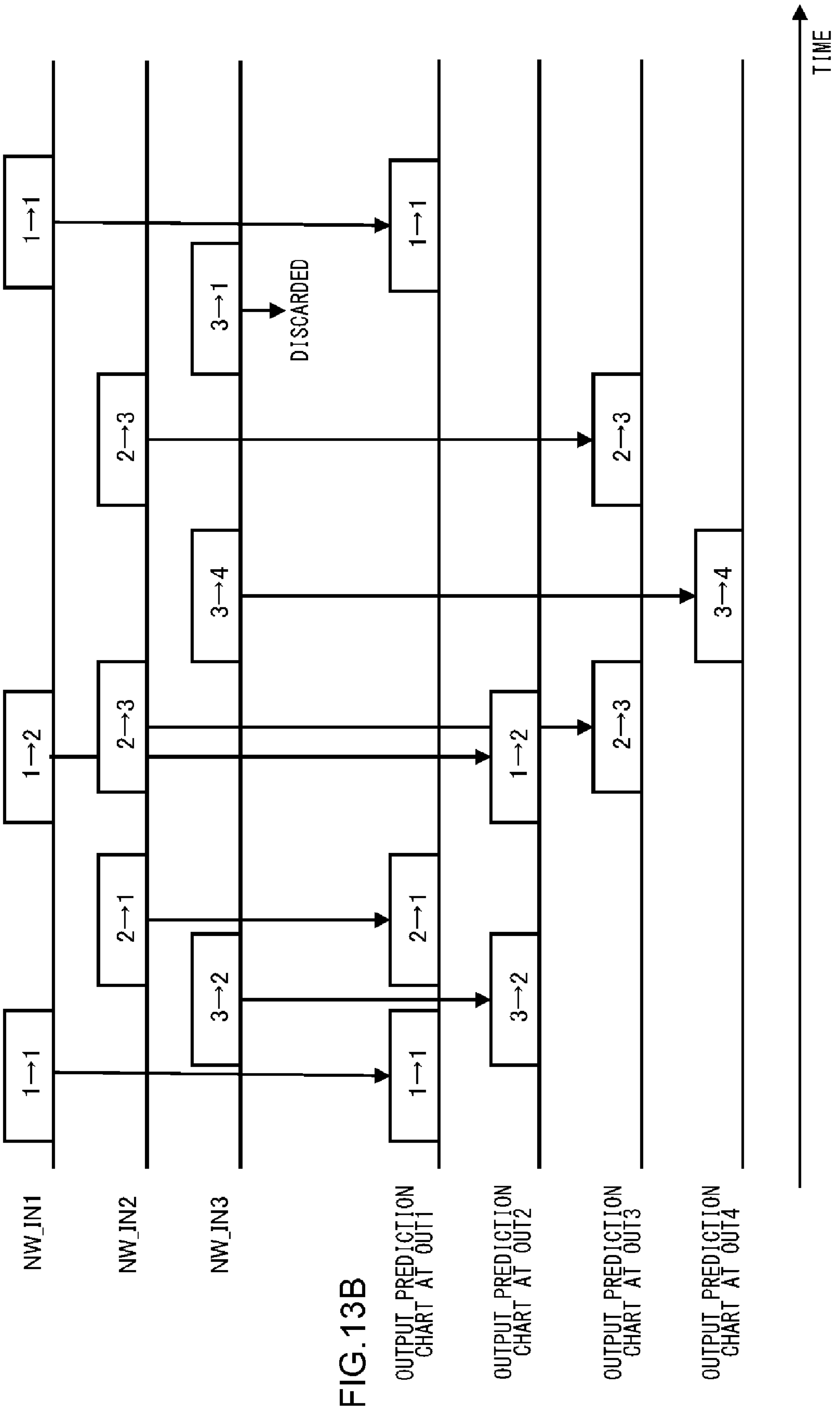
FIGS. 13A and 13B show an example of output prediction charts of network optical packet signals inputted to first to third network input units.

FIGS. 13A and 13B show an example of output prediction charts at the respective output ports. FIG. 13A shows network optical packet signals inputted to the first to third network input units NW_IN1 to NW_IN3. FIG. 13B shows the output prediction charts at the first to fourth output ports OUT1 to OUT4. When there is any temporal competition between network optical packet signals, the network optical packet signal having arrived first is placed preferentially, and the network optical packet signal having arrived later is discarded. All the network optical packet signals not in temporal competition are mapped, and then free time slots without the presence of any network optical packet signal are monitored in real time.

Figure 14:
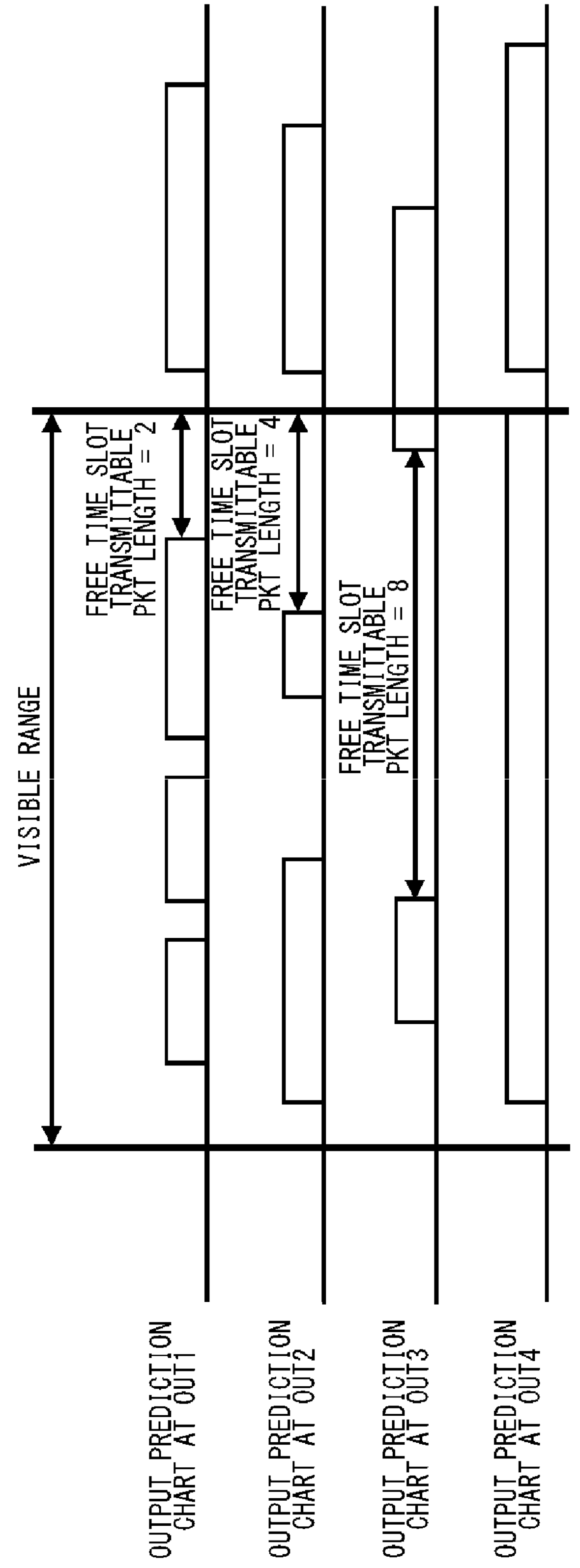
FIG. 14 illustrates how free time slots are monitored.

FIG. 14 illustrates how the free time slots are monitored. FIG. 14 represents an output prediction chart for a certain instant. It is to be imagined that the optical packet signals shown in this illustration will progress rightward in succession, and newly arriving optical packet signals will appear at the left one after another. Since the delay time caused by the network delay unit is longer than the delay time caused by the client delay unit, it is possible to provide a "visible range" for the recognition of the presence or absence of optical packet signals for a predetermined duration. Now this confines the recognition process to a determination of possibility of inserting an optical packet signal shorter than the visible range. Therefore, if a long optical packet signal, such as a jumbo packet, is to be inserted, it is necessary to secure a visible range long enough for that. In other words, the delay difference between the network delay unit and the client delay unit must be made larger.

The first to fourth output-prediction-chart generator 27*a* to 27*d* detect free time slots within the visible range based on the output prediction charts of the respective output ports as shown in FIG. 14, and output the transmittable timings and transmittable packet lengths to the optical packet transmitting apparatus 12 as free time slot information. As shown in FIG. 12, the respective pieces of free time slot information are outputted from the first to fourth output-prediction-chart generators 27*a* to 27*d* and inputted to the first to fourth output buffers 22*a* to 22*d* of the optical packet transmitting apparatus 12. Also, the first to fourth output-prediction-chart generators 27*a* to 27*d* output the generated output prediction charts to the first to fourth control signal generators 28*a* to 28*d*.

Upon receipt of the free time slot information, the optical packet transmitting apparatus 12 transmits a client optical packet signal. Now the client optical packet signal arrives at the fourth header input unit H_IN4 of the optical switch control unit 15 after a predetermined delay time. This client optical packet signal is inputted to the client analysis unit 25*d*. The client analysis unit 25*d* converts the received client optical packet signal into an electrical network packet signal and then extracts the destination information and the packet length information by analyzing the header. Then the client analysis unit 25*d* selects the output port for the client optical packet signals to be inputted to the optical switch unit 14, using the destination/output port correspondence table 26. Also, the client analysis unit 25*d* records the time of arrival of the client optical packet signal. The information such as the packet length and the time of arrival of the client optical packet signal obtained by the client analysis unit is transferred to the first to fourth control signal generators 28*a* to 28*d*.

The first to fourth control signal generators 28*a* to 28*d*, respectively, determine the actual control of the optical switch control unit 15 on a first-come-first-served basis by superposing the client optical packet signal on the output prediction charts, and output the optical switch control signal to the optical switch unit 14. It is to be noted here that since there is a time difference between the network input port and the client output port, a process to adjust the temporal axes by putting a delay in either one of them is required. Note also that there may be cases where, because of the empty output buffer of the optical packet transmitting apparatus 12, no client optical packet signal is outputted despite the notification of a free time slot. In such a case, the only handling required is such as when there is no optical packet signal at the client input unit.

The division of roles for the optical packet switching system as described above is as follows.

(1) The optical packet transmitting apparatus 12 stores client packet signals in the output buffer.

(2) The optical switch control unit 15 conveys free time slot information to the optical packet transmitting apparatus 12.

(3) The optical packet transmitting apparatus 12 determines on its own whether a client packet signal stored in the output buffer can be placed in the free time slot and, if said client packet can, outputs said client packet as the client optical packet.

(4) The optical switch control unit 15 switches the route according to the header content of the client optical packet signal received from the optical packet transmitting apparatus 12.

In the following, a descriptions will be given of optical packet switching systems using other methods than the optical packet switching system described above.

FIG. 15 illustrates an optical packet switching system according to another embodiment of the present invention. The optical packet switching system 10 according to the present embodiment differs from the optical packet switching system of FIG. 1 in that whether or the client optical packet signal is to be outputted is determined by the optical switch control unit 15. Components of the optical packet switching system according to the present embodiment which are identical to or correspond to those of the optical packet switching system shown in FIG. 1 are given the same reference numerals herein and the repeated description thereof are omitted as appropriate.

Operation procedures performed, in the order of (1) to (6), by the optical packet switching system 10 according to the present embodiment are as follows.

(1) The optical packet transmitting apparatus 12 stores client packet signals in the output buffer.

(2) The optical packet transmitting apparatus 12 conveys the packet length information on a client optical packet signal stored in the head of the output buffer, to the optical switch control unit 15.

(3) The optical switch control unit 15 constantly monitors free time slots.

(4) If it is determined that the transmittable packet length of a free time slot is longer than or equal to the packet length of the client optical packet signal conveyed from the optical packet transmitting apparatus 12, the optical switch control unit 15 will issue a transmission start trigger to the optical packet transmitting apparatus 12.

(5) Upon receipt of the transmission start trigger, the optical packet transmitting apparatus 12 converts the client packet signal in the head of the output buffer into a client optical packet signal and then transmits the optical packet signal.

(6) The optical switch control unit 15 switches the route according to the header content of the client optical packet signal received from the optical packet transmitting apparatus 12.

Figure 16:
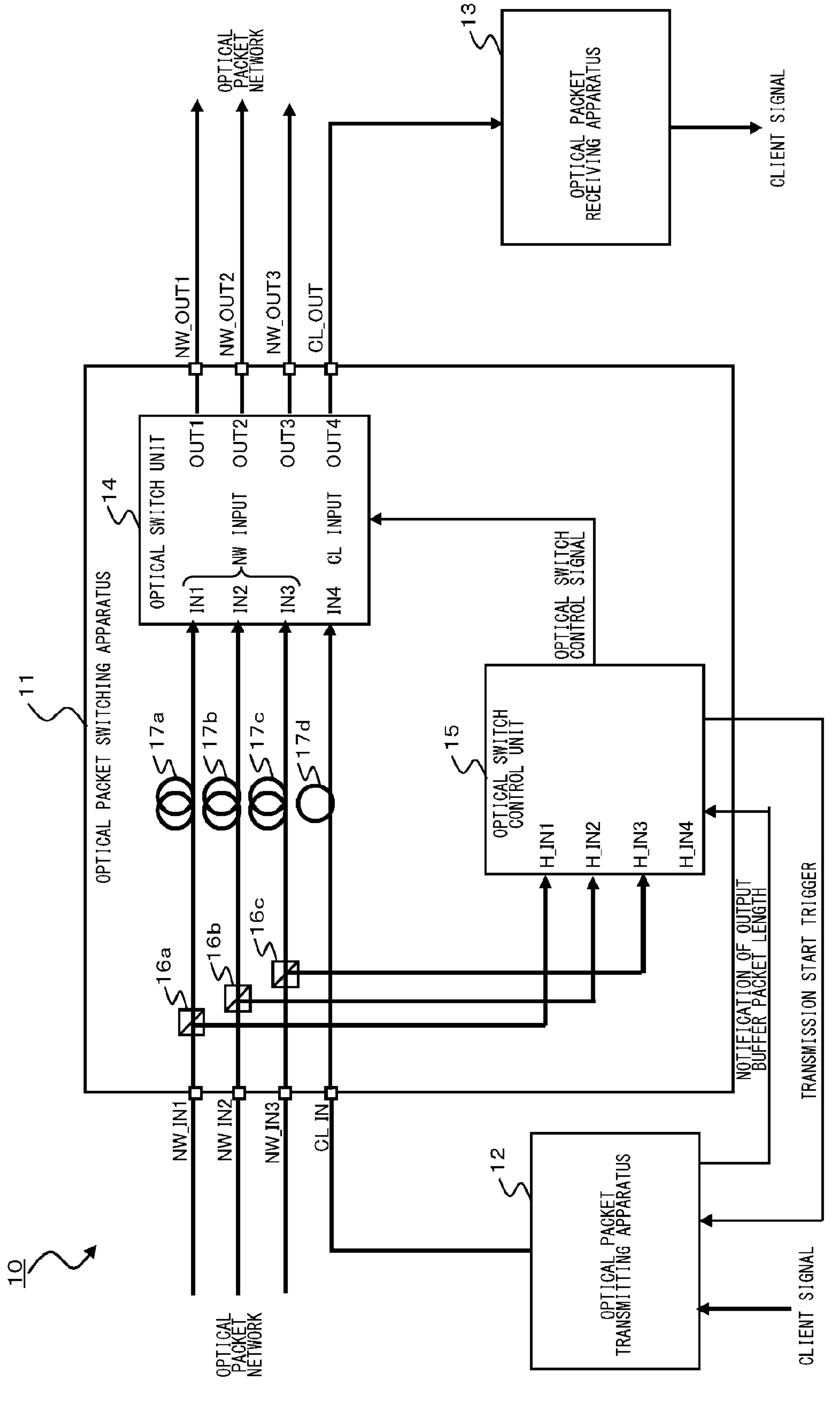
FIG. 16 illustrates an optical packet switching system according to still another embodiment of the present invention.

FIG. 16 illustrates an optical packet switching system according to still another embodiment of the present invention. The optical packet switching system 10 according to the present embodiment differs from the above-described optical packet switching system of FIG. 15 in that the client optical packet signal is not inputted to the fourth header input unit H_IN4 of the optical switch control unit 15. Thus, the branching unit for branching off the client optical packet signal is not provided in the preset embodiment. Components of the optical packet switching system according to the present embodiment which are identical to or correspond to those of the optical packet switching system shown in FIG. 1 are given the same reference numerals herein and the repeated description thereof are omitted as appropriate.

Operation procedures performed, in the order of (1) to (6), by the optical packet switching system 10 according to the present embodiment are as follows. Note that the procedures are identical to those for the optical packet switching system of FIG. 15 up to (5).

(1) The optical packet transmitting apparatus 12 stores client packet signals in the output buffer.

(2) The optical packet transmitting apparatus 12 conveys the packet length information on a client optical packet signal stored in the head of the output buffer, to the optical switch control unit 15.

(3) The optical switch control unit 15 constantly monitors free time slots.

(4) If it is determined that the transmittable packet length of a free time slot is longer than or equal to the packet length of the client optical packet signal conveyed from the optical packet transmitting apparatus 12, the optical switch control unit 15 will issue a transmission start trigger to the optical packet transmitting apparatus 12.

(5) Upon receipt of the transmission start trigger, the optical packet transmitting apparatus 12 converts the client packet signal in the head of the output buffer into a client optical packet signal and then transmits the optical packet signal.

(6) The optical switch control unit 15 controls the optical switch unit 14 in the anticipation that the client optical packet signal arrives after a predetermined time length passes after the issuance of the transmission start trigger.

In the present embodiment, it is crucial that the arrival time of the optical packet signal from the optical packet transmitting apparatus 12 at the optical switch unit 14 can be kept precisely constant. If this can be accomplished, the present embodiment is advantageous in terms of cost because the number of components required is reduced.

Figures 17A, 17B, 17C:
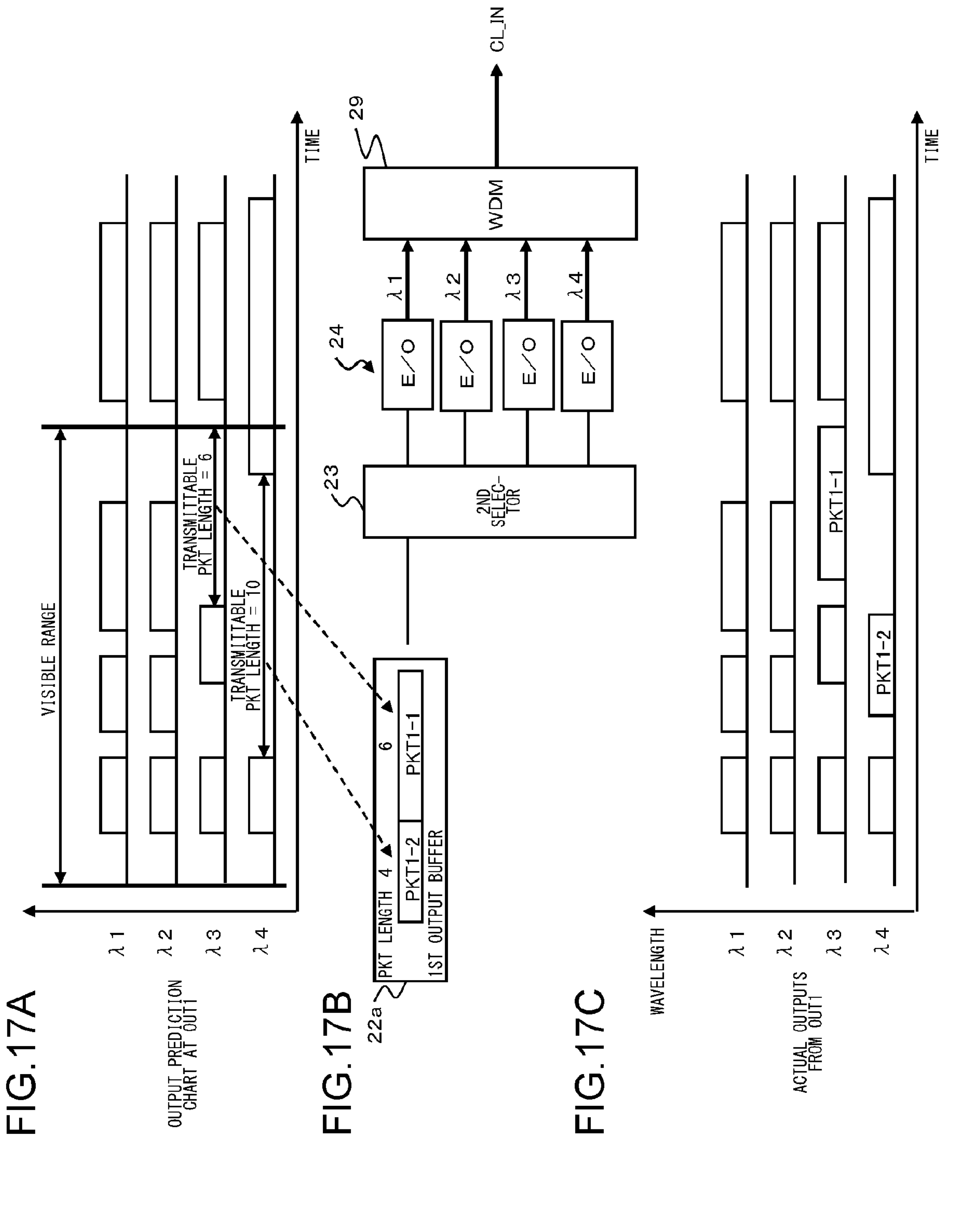
FIG. 17A to 17C represent a diagram by which to explain still another operations of an optical packet transmitting apparatus.

FIG. 17A to 17C represent a diagram by which to explain still another operations of the optical packet transmitting apparatus. In the above-described embodiments, a method is employed where free time slots are detected along the time axis and then the insertion is made. Instead, a method may be employed where the free time slots are detected along the wavelength axis and then the insertion is made. In the optical packet switching scheme, there are cases where the WDM optical packet signals, in which optical packet signals of multiple wavelengths have been wavelength-multiplexed, are subjected to the optical packet switching. In such a case, the optical switch control unit 15 detects free time slots for each wavelength of the optical packet signal. Then the optical packet transmitting apparatus 12 adjusts the transmit timing of the client optical packet signal and the wavelength thereof so that the client optical packet signal can be inserted into the free time slot.

FIG. 17A shows an example of output prediction chart at the first output port OUT1. The output-prediction-chart generator 27*a* of the optical switch control unit 15 generates an output prediction chart for each of the wavelengths λ1 to λ4. In the FIG. 17A, a free time slot of transmittable packet length=6 is detected in the wavelength λ3, and a free time slot of transmittable packet length=10 is detected in the wavelength λ4. The optical switch control unit 15 conveys these free time slots to the optical packet transmitting apparatus 12.

FIG. 17B shows an operation of the optical packet transmitting apparatus 12 that has received the free time slot information. The packet length, which equals 6, of the client packet signal PKT1-1 stored at the head is shorter than or equal to the notified transmittable packet length, which equals 6, of the free time slot of the wavelength λ3. Thus, the first output buffer 22*a* of the optical packet transmitting apparatus 12 that has received the free time slot information determines that the client packet signal PKT1-1 be placed in this free time slot, and then outputs the client packet signal PKT1-1. Similarly, the packet length, which equals 4, of the client packet signal PKT1-2 stored in a second place is shorter than or equal to the notified transmittable packet length, which equals 10, of the free time slot of the wavelength λ4. Thus, the first output buffer 22*a* similarly determines that the client packet signal PKT1-2 be placed in this free time slot, and then outputs the client packet signal PKT1-2. The client optical packet signal PKT1-1 of the wavelength λ3 and the client optical packet signal PKT1-2 of the wavelength λ4 outputted from the electrical/optical converter 24 are multiplexed, and the thus multiplexed signal is sent out to the client input unit CL_IN of the optical packet switching apparatus 11.

FIG. 17C shows actual outputs from the first output port OUT1 of the optical switch unit 14. As shown in FIG. 17C, according to the present embodiment, the first client optical packet PKT1-1, which is inserted into the free time slot of the wavelength λ3, and the second client optical packet signal PKT1-2, which is inserted into the free time slot of the wavelength λ4, can be sent out from the optical packet switching apparatus 11. In this manner, the free time slots are detected along not only the time axis but also the wavelength axis and then the client optical packet signals are inserted into the detected free time slots, so that further improvement in the bandwidth usage efficiency can be achieved.

FIG. 18 illustrates an example of header format in the above embodiment described in conjunction with FIG. 17A to 17C. As shown in FIG. 18, the header includes "destination address", "source address", "packet length", and "information on frequency in use". The "information on frequency in use" is parallel bit information; "1" is assigned to a frequency in use and "0" is assigned to a frequency not in use.

Figure 19:
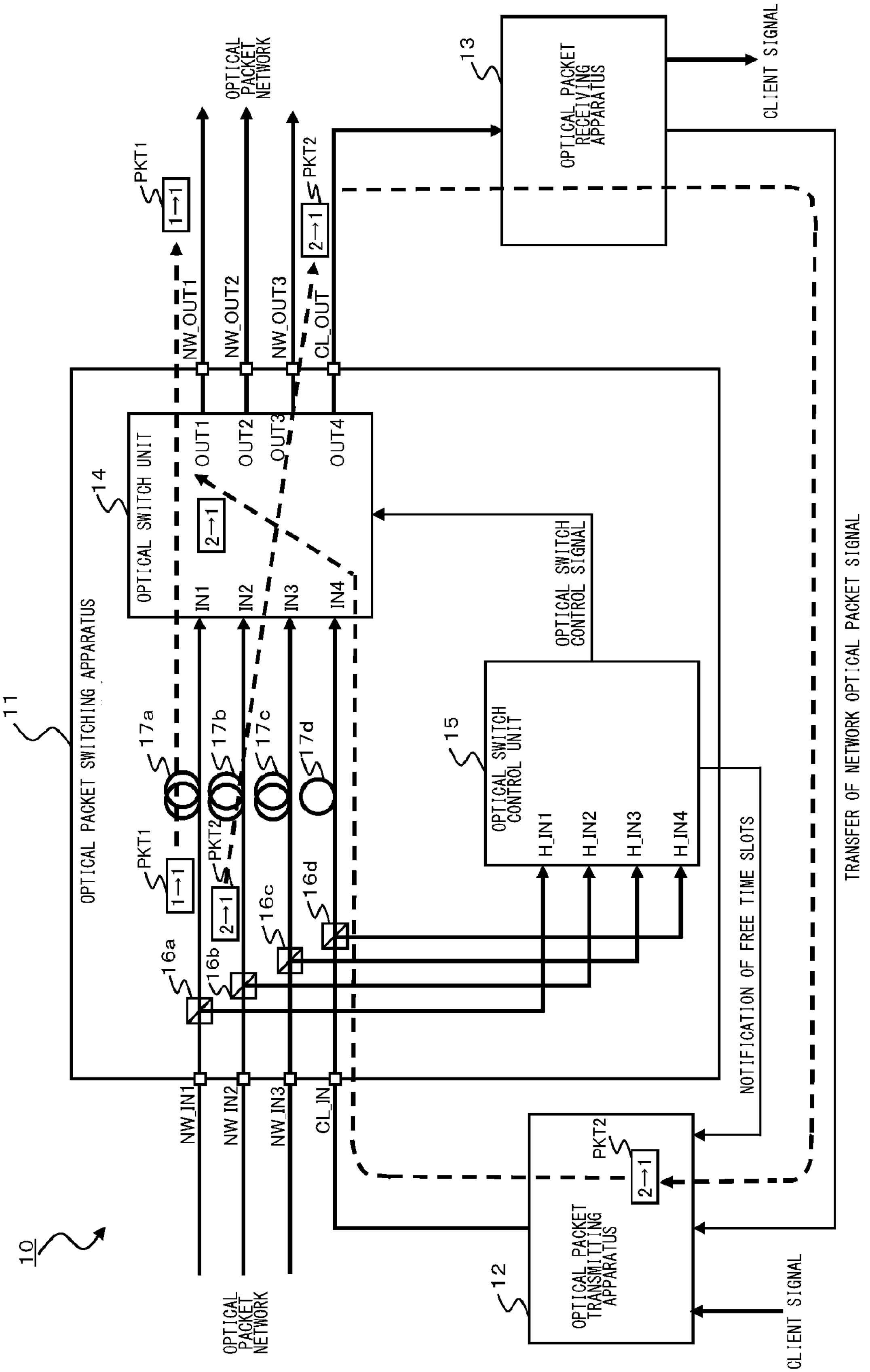
FIG. 19 illustrates an optical packet switching system according to still another embodiment of the present invention.

FIG. 19 illustrates an optical packet switching system according to still another embodiment of the present invention. According to the optical packet switching system according to the above-described embodiments, the temporal competition between the network optical packet signal and the client optical packet signal can be avoided. Nevertheless, as described above, the network optical packet signals are the optical packet signals sent from the other optical packet switching systems, so that the temporal competition between the network optical packets signals cannot be avoided. In the light of the foregoing, shown below is a method for avoiding the discarding of an optical packet signal arriving later when a temporal competition occurs between the network optical packet signals. Components of the optical packet switching system, according to this embodiment employing this method, which are identical to or correspond to those of the optical packet switching system shown in FIG. 1 are given the same reference numerals herein and the repeated description thereof are omitted as appropriate.

Let us assume that, as shown in FIG. 19, a network optical packet PKT1, which is to be outputted to the first output port OUT1, arrives first at the first network input unit NW_IN1 and also assume that, thereafter, a network optical packet signal PKT2, which is also to be outputted to the first output port OUT1, arrives at the second network input unit NW_IN2. In this case, the optical switch control unit 15 has the network optical packet signal PKT1, which has arrived first, outputted preferentially to the first output port OUT1.

Notice here that the network optical packet signal PKT2, which has arrived later, would have been discarded in the above-described optical packet switching systems. However, in the present embodiment, instead of being discarded, the network optical packet signal PKT2 is outputted to the fourth output port OUT4. The network optical packet signal PKT2 that has been outputted from the fourth output port OUT4 is received by the optical packet receiving apparatus 13 and is converted into an electrical network packet signal PKT2 before it is transferred to the optical packet transmitting apparatus 12. Alternatively, the optical packet receiving apparatus 13 may transfer the network optical packet signal PKT2, while it is being kept as the optical signal, to the optical packet transmitting apparatus 12 before the optical packet transmitting apparatus 12 converts the optical packet signal PKT2 into an electrical network packet signal PKT2.

The network packet signal PKT2 received by the optical packet transmitting apparatus 12 is treated the same way as the client packet signal. In other words, the network packet signal PKT2 is stored in the output buffer and will be outputted when the free time slot information is received from the optical switch control unit 15. Thereby, the network optical packet PKT2 is sent out from the targeted first output port OUT1.

By employing the optical packet switching system 10 according to the present embodiment, the discarding of the network optical packet signal can be reduced, so that the communication quality can be further improved.

Figure 20:
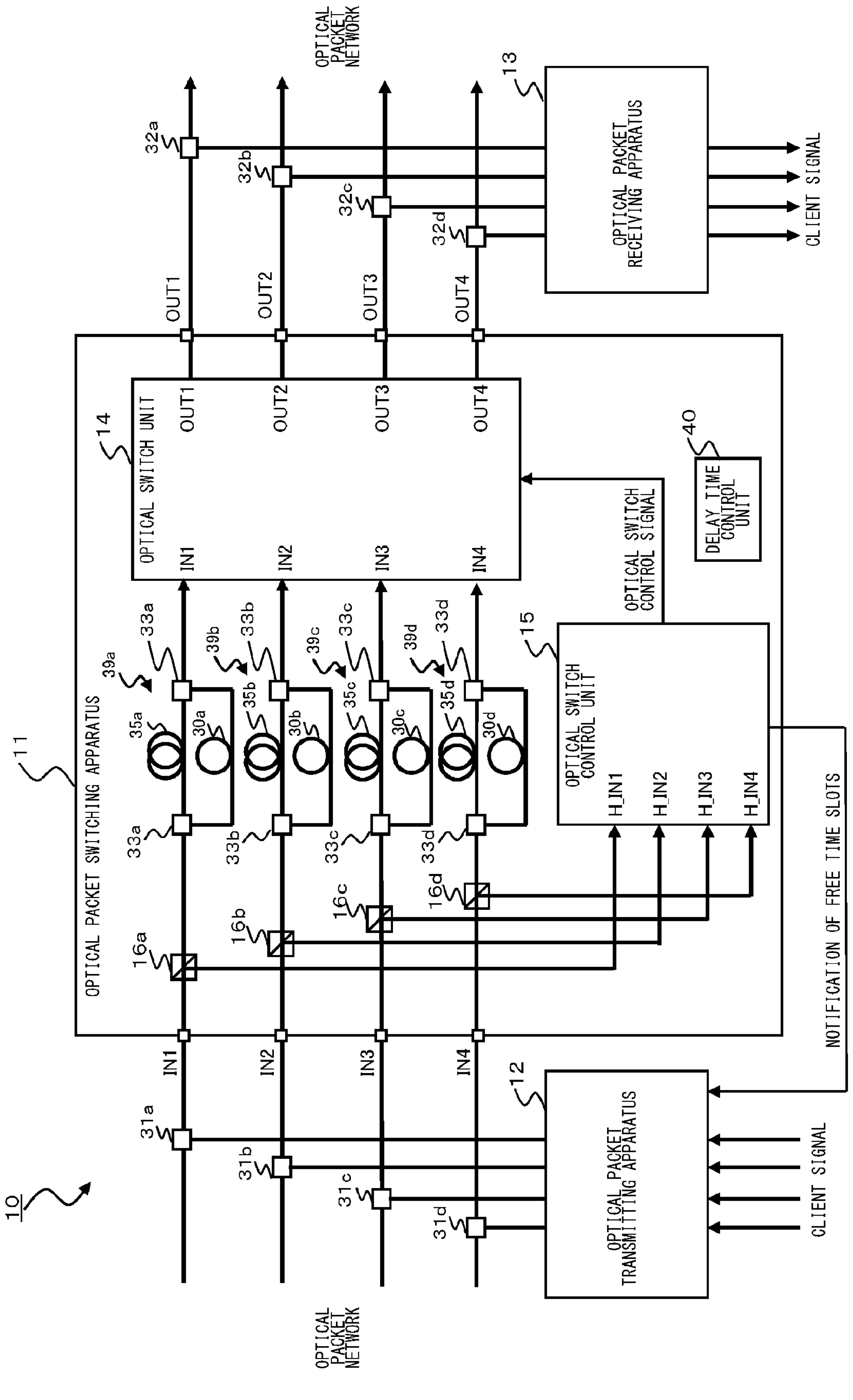
FIG. 20 illustrates an optical packet switching system according to still another embodiment of the present invention.

FIG. 20 illustrates an optical packet switching system according to still another embodiment of the present invention. The optical packet switching system 10 according to the present embodiment is provided with first to fourth input units IN1 to IN4 and first to fourth output units OUT1 to OUT4. Components of the optical packet switching system according to the present embodiment which are identical to or correspond to those of the optical packet switching system shown in FIG. 1 are given the same reference numerals herein and the repeated description thereof are omitted as appropriate.

First to fourth input selective optical switches 31*a* to 31*d* are provided at a state prior to the first to fourth input units IN1 to IN4, respectively. The first to fourth input selective optical switches 31*a* to 31*d* switch the kind of optical packet signals inputted to the first to fourth input units IN1 to IN4, respectively, between the network optical packet signal and the client optical packet signal.

Also, first to fourth output selective optical switch 32*a* to 32*d* are provided at a stage subsequent to the first to fourth output units OUT1 to OUT4, respectively. The first to fourth output selective optical switches 32*a* to 32*d* switch the output destination of optical packet signals, respectively, between the optical packet network and the optical packet receiving apparatus 13.

Also, in the present embodiment, first to fourth optical delay time variable units 39*a* to 39*d* are provided between the first to fourth optical branching units 16*a* to 16*d* and the first to fourth input ports IN1 to IN4 of the optical switch unit 14, respectively. The first to fourth optical delay time variable units 39*a* to 39*d* each can vary the delay time of the other of the branched-off optical packet signals branched off by the first to fourth optical branching units 16*a* to 16*d*, respectively.

The optical packet switching apparatus 11 is provided with a delay time control unit 40 so that the delay times of the first to fourth optical delay time variable units 39*a* to 39*d* can be controlled individually. If the client optical packet signal fed from the optical packet transmitting apparatus is inputted to one of the optical delay time variable units, the delay time control unit 40 will control the delay time of said optical delay time variable unit to a first predetermined delay time. If, on the other hand, the network optical packet signal is inputted to one of the optical delay time variable units from the other optical packet switching systems, the delay time control unit 40 will control the delay time of said optical delay time variable unit to a second predetermined time, which is longer than the first predetermined delay time. As described earlier, the type of optical packet signals inputted to the first to fourth optical delay time variable units 39*a* to 39*d* is switched by the first to fourth input selective optical switches 31*a* to 31*d*.

The first to fourth optical delay time variable units 39*a* to 39*d* includes first to fourth client optical delay units 30*a* to 30*d* for delaying the optical packet signals by the first delay time, first to fourth network optical delay units 35*a* to 35*d* for delaying the optical packet signals by the second delay time, first to fourth delay selective optical switches 33*a* to 33*d*, provided before the first to fourth network optical delay units 35*a* to 35*d* and the first to fourth client optical delay units 30*a* to 30*d*, for selectively switching the kind of delay units, and another first to fourth delay selective optical switches 33*a* to 33*d*, provided after the first to fourth network optical delay units 35*a* to 35*d* and the first to fourth client optical delay units 30*a* to 30*d*, for selectively switching the kind of delay units, respectively. The first to fourth delay selective optical switches 33*a* to 33*d* are controlled by the delay time control unit 40.

Also, the optical switch control unit 15 operates differently between when the network optical packet signal is inputted and when the client optical packet signal is inputted. Thus, a logic circuitry is selectable according to the inputted optical packet signal.

By employing the optical packet switching system 10 according the present embodiment, the usage of the input/output units of the optical packet switching apparatus 11 is not fixed but selectable freely, so that a flexible system implementing the optical packet switching system 10 can be configured.

Differing from the optical switch unit 14, the first to fourth input selective optical switches 31*a* to 31*d*, the first to fourth output selective optical switches 32*a* to 32*d* and the first to fourth delay selective optical switches 33*a* to 33*d* need not be switched on a packet-by-packet basis. Thus, the response speed on the order of seconds or so is sufficient and those at low cost and with low loss may be used.

If, in the optical packet switching system 10 according to the present embodiment, there are provided a plurality of input units to which the client optical packet signals are inputted, the competition determination may be made between the client optical packet signals because optical packet signals from a plurality of input units cannot be inserted into a given time slot.

Figure 21:
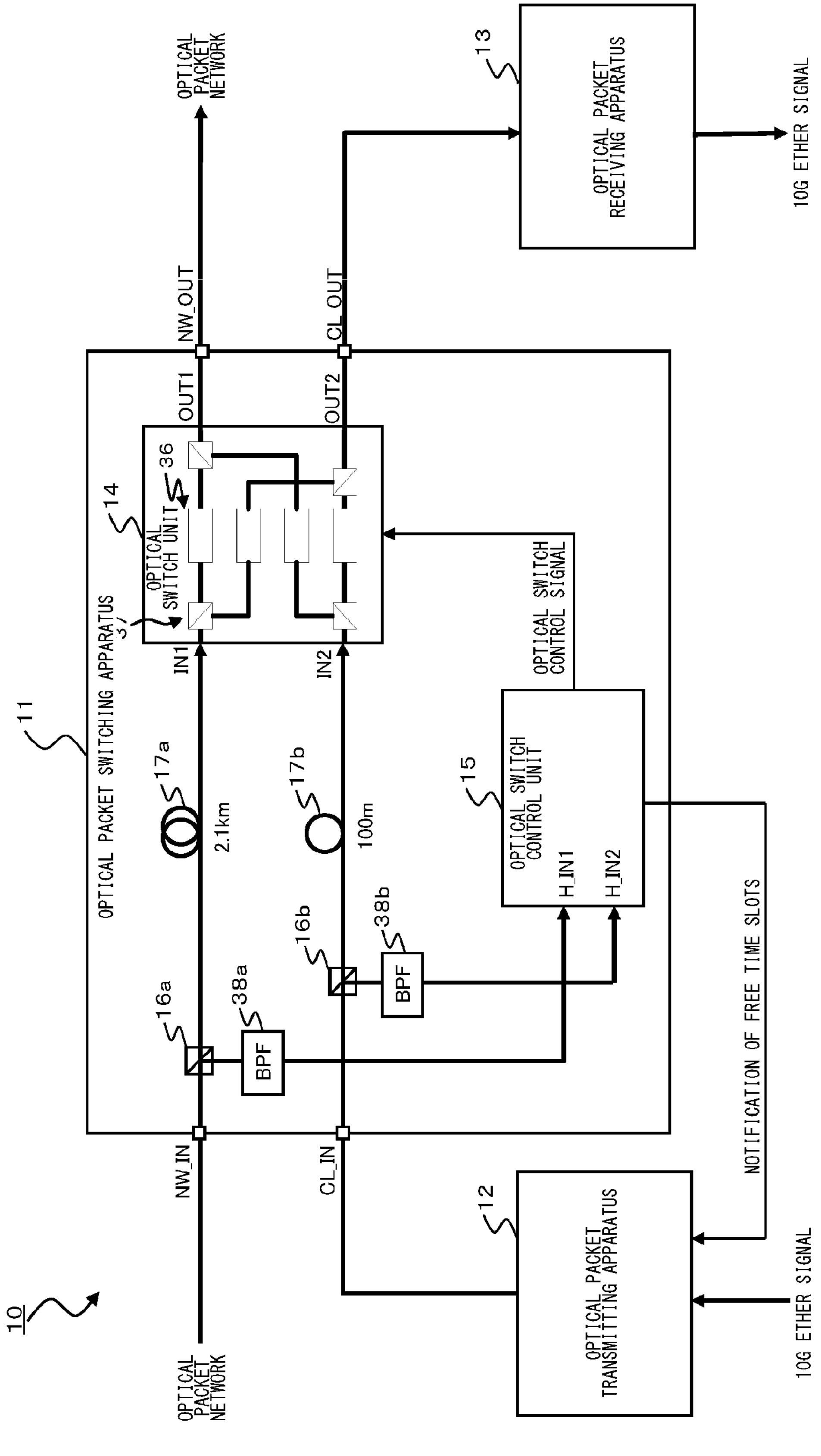
FIG. 21 illustrates an optical packet switching system according to an exemplary embodiment of the present invention.
Figure 22:
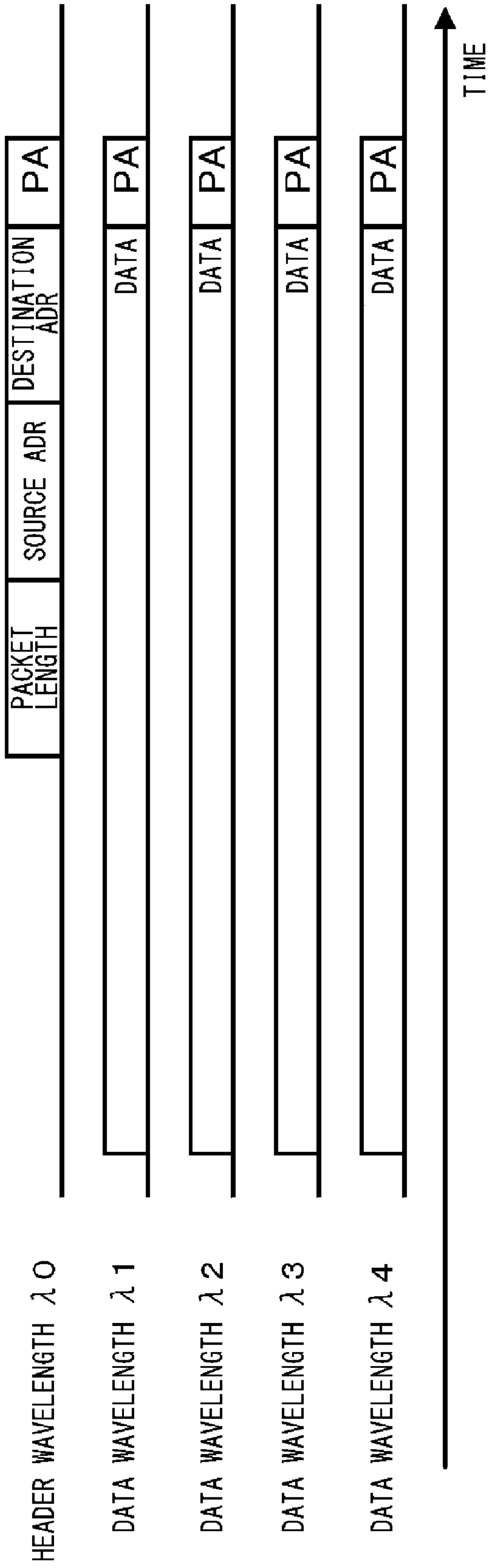
FIG. 22 illustrates formats of optical packet signal in the exemplary embodiment shown in FIG. 21.

FIG. 21 shows an optical packet switching system according to an exemplary embodiment of the present invention. FIG. 22 shows formats of the optical packet signals according to this exemplary embodiment.

As shown in FIG. 22, in this exemplary embodiment, a header including destination address, source address, packet length, and the like is carried by an optical packet signal of header wavelength λ0, whereas data are carried by optical packet signals of header wavelengths λ1 to λ4. Attached to the head of each optical packet signal is a preamble (PA). The optical packet signals of these wavelengths λ0 to λ4 are wavelength-multiplexed and transmitted as WDM optical packet signals.

The client signal is a 10G Ethernet (registered trademark) signal. The optical packet transmitting apparatus 12 divides the received client signal into four parts and put them on the optical packet signals of data wavelengths λ1 to λ4. Then the optical packet transmitting apparatus 12 wavelength-multiplexes the optical packet signal of header wavelength λ0 and the optical packet signals of data wavelengths λ1 to λ4, and transmits them. Where there are no optical packet signals, the optical packet transmitting apparatus 12 performs control such that "0" is repeated as the optical output.

In the present exemplary embodiment, the optical packet switching apparatus 11, which is an optical packet switching apparatus with two inputs and two outputs, has a network input unit NW_IN, a client input unit CL_IN, a network output unit NW_OUT, and a client output unit CL_OUT.

Bandpass filters 38*a* and 38*b* are provided to extract the optical packet signals of header wavelength λ0 only from the WDM optical packet signals. The thus extracted optical packet signals of header wavelength λ0 are inputted to header input units H_IN1 and H_IN2 of an optical switch control unit 15.

An optical switch unit 14 has four semiconductor optical switch gate elements 36 and four optical couplers 37, which are capable of high-speed operation of the nanosecond order.

In the present exemplary embodiment, the optical fiber length of a network optical delay unit 17*a* is assumed to be 2.1 km, and the optical fiber length of a client optical delay unit 17*b* to be 100 m. Accordingly, the optical path difference between the network optical delay unit 17*a* and the client optical delay unit 17*b* is about 2 km. The loss caused by the optical fiber in this case is about 0.5 dB, which is an almost negligible value.

The arrival time difference of optical packet signals on account of the optical path difference of 2 km is about 10 μs. From this about 10 μs, it is necessary to subtract (1) the time 1 from the reading of header to the outputting of free time slot information by the optical switch control unit 15 and (2) the time 2 from the receiving of free time slot information to the outputting of client optical packet signal by the optical packet transmitting apparatus 12. This calculation of the visible range may be significantly affected by the circuit architecture and the design of the processing CLK frequency and the number of FF stages within an LSI. Yet, it may be feasible by FPGA or the like provided that the time 1 is about 500 ns, the time 2 about 500 ns, and the total about 1 μs. Hence, a visible range of about 9 μs may be secured.

On the other hand, if the signal speed of an optical packet signal is 10 Gbit/s, the time of 0.1 ns is occupied by 1 bit. With the 10G Ether packet of 1250 bytes, the time of 0.1 ns×1250×8 bits/4=250 ns will be occupied by each packet in terms of the optical packet signal divided into four parts. The calculation of 9 μs divided by 250 ns indicates that 36 optical packet signals can be held within the delay time difference. Since even three jumbo packets of 9600 bytes can be held therein, the visible range that can be secured is considered adequate.

The present invention has been described based upon illustrative embodiments. The above-described embodiments are intended to be illustrative only and it will be obvious to those skilled in the art that various modifications to the combination of constituting elements and processes could be further developed and that such modifications are also within the scope of the present invention.

What is claimed is:

1. An optical packet switching system comprising:

an optical packet switching apparatus configured to switch a route of an inputted optical packet signal; and an optical packet transmitting apparatus configured to generate a client optical packet signal from a received client signal and configured to send out the generated client optical packet signal to the optical packet switching apparatus, the optical packet switching apparatus including:

a client branching unit configured to branch off the client optical packet signal fed from the optical packet transmitting apparatus;

a network branching unit configured to branch off a network optical packet signal fed from another optical packet switching system;

a client optical delay unit configured to delay one of the branched-off client optical packet signals branched off by the client branching unit;

a network optical delay unit configured to delay one of the branched-off network optical packet signals branched off by the network branching unit, the network optical delay unit having a longer delay time than that of the client optical delay unit;

an optical switch unit having a client input port for inputting the client optical packet signal fed from the client optical delay unit, a network input port for inputting the network optical packet signal fed from the network optical delay unit, and an output port, the optical switch unit being configured to switch the route of the inputted client optical packet signal and the network optical packet signal so as to be sent out from the output port; and an optical switch control unit configured to input both the other of the branched-off client optical packet signals branched off by the client branching unit and the other of the branched-off network optical packet signals branched off by the network branching unit and configured to control the optical switch unit based on an analysis result of the inputted optical packet signals, wherein the optical switch control unit is configured such that a free time slot, during which no network optical packet signal is sent out from the output port, is detected, and wherein the optical packet transmitting apparatus adjusts transmit timing, with which the client optical packet signal is sent out, in such a manner that the client optical packet signal is inserted into the free time slot.

2. The optical packet switching system according to claim 1, wherein the optical switch control unit is so configured as to convey transmittable timing and transmittable packet length of the client optical packet signal to the optical packet transmitting apparatus, based on the detected free time slot, the optical packet transmitting apparatus further including:

an input buffer configured to store the received client signal;

a packet generator configured to generate a client packet signal by adding a header, containing packet length information, to the client signal stored in the input buffer;

an output buffer configured to store the generated client packet signal, wherein, when the packet length of the client packet signal stored in a head is shorter than or equal to the transmittable packet length of the client packet signal, the output buffer outputs the client packet signal in time with the transmittable timing; and an electrical/optical converter configured to convert the client packet signal outputted from the output buffer into a client optical packet signal and configured to send out the converted client optical packet signal to the optical packet switching apparatus.

3. The optical packet switching system according to claim 2, wherein, when the packet length of the client packet signal stored in the head is longer than the transmittable packet length, the output buffer divides the client packet signal into a plurality of signals each of which is shorter than or equal in length to the transmittable packet length, and outputs the divided packet signals.

4. The optical packet switching system according to claim 3, wherein the output buffer appends to each of the divided packet signals a divisional flag indicating that each of the divided packet signals is a client packet signal after division, a packet identification number by which to distinguish from other client packet signals, an output order from the output buffer, and a final packet flag indicating whether the each thereof is a divided packet signal outputted last or not.

5. The optical packet switching system according to claim 2, wherein, when the packet length of the client packet signal stored in the head is longer than the transmittable packet length, the output buffer searches for a client packet having a packet length shorter than or equal to the transmittable packet length from among client packet signals stored thereafter, and outputs the found client packet signal.

6. The optical packet switching system according to claim 2, wherein, when the packet length of the client packet signal stored in the head is shorter than or equal to the transmittable packet length, the output buffer searches for a client packet whose packet length is shorter than a difference calculated by subtracting the packet length of the client packet signal stored at the head from the transmittable packet length from among client packet signals stored thereafter, and outputs the found client packet signal following the client packet signal at the head.

7. The optical packet switching system according to claim 2, the optical switch control unit including:

a network analysis unit for detecting the time of arrival and packet length of the network optical packet signal;

an output-prediction-chart generator for generating an output prediction chart that indicates a temporal location of the network optical packet signal at the output port, based on the detected arrival time and packet length thereof, and conveying the transmittable timing and the transmittable packet length to the optical packet transmitting apparatus based on the output prediction chart;

a client analysis unit for detecting the time of arrival and packet length of the client optical packet signal outputted from the optical packet transmitting apparatus, when the transmittable timing and the transmittable packet length have been conveyed; and a control signal generator for determining whether to pass or discard the network optical packet signal and the client optical packet signal at the output port, based on the time of arrival and the packet length from the client analysis unit and the output prediction chart from the output-prediction-chart generator, and outputting a control signal to the optical switch unit.

8. The optical packet switching system according to claim 1, the optical packet transmitting apparatus further including:

an input buffer configured to store the received client signal;

a packet generator configured to generate a client packet signal by adding a header, containing packet length information, to the client signal stored in the input buffer;

an output buffer configured to store the generated client packet signal and configured to convey the packet length information on a client packet signal stored in the head to the optical packet switching apparatus, wherein, when a transmission start trigger is conveyed from the switch control unit, the output buffer outputs the client packet signal; and an electrical/optical converter configured to convert the client packet signal outputted from the output buffer into a client optical packet signal and send out the converted signal to the optical packet switching apparatus.

9. The optical packet switching system according to claim 8, the optical switch control unit including:

a network analysis unit for detecting the time of arrival and the packet length of the network optical packet signal from the network branching unit;

an output-prediction-chart generator for generating an output prediction chart that indicates a temporal location of the network optical packet signal at the output port, based on the detected arrival time and packet length thereof, wherein, when a transmittable packet length of the free time slot detected from the output prediction chart is greater than or equal to the packet length of the client packet signal conveyed from the optical packet transmitting apparatus, the output-prediction-chart generator conveys the transmission start trigger to the optical packet transmitting apparatus;

a client analysis unit for detecting the time of arrival and packet length of the client optical packet signal outputted from the optical packet transmitting apparatus, when the transmission start trigger has been received; and a control signal generator for determining whether to pass or discard the network optical packet signal and the client optical packet signal at the output port, based on the time of arrival and the packet length from the client analysis unit and the output prediction chart from the output-prediction-chart generator, and outputting a control signal to the optical switch unit.

10. An optical packet switching system comprising:

an optical packet switching apparatus configured to switch a route of an inputted optical packet signal: and an optical packet transmitting apparatus configured to generate a client optical packet signal from a received client signal and configured to send out the client optical packet signal to the optical packet switching apparatus, the optical packet switching apparatus including:

a network branching unit configured to branch off a network optical packet signal fed from another optical packet switching system;

a client optical delay unit configured to delay the client optical packet signal fed from the packet transmitting apparatus;

a network optical delay unit configured to delay one of the branched-off network optical packet signals branched off by the network branching unit, the network optical delay unit having a longer delay time than the client optical delay unit;

an optical switch unit having a client input port for inputting the client optical packet signal fed from the client optical delay unit, a network input port for inputting the network optical packet signal fed from the network optical delay unit, and an output port, the optical switch unit being configured to switch the route of the inputted client optical packet signal and the network optical packet signal so as to be sent out from the output port;

an optical switch control unit configured to input the other of the branched-off network optical packet signals branched off by the network branching unit and configured to control the optical switch unit based on an analysis result of the network optical packet signal, the optical packet transmitting apparatus including:

an input buffer configured to store the received client signal;

a packet generator configured to generate a client packet signal by adding a header containing packet length information to a client signal stored in the input buffer; and an output buffer configured to store the generated client packet signal and configured to convey the packet length information on a client packet signal stored in a head to the optical packet switching apparatus, wherein, when a transmission start trigger is conveyed from the switch control unit, the output buffer outputs the client packet signal; and an electrical/optical converter configured to convert the client packet signal outputted from the output buffer into a client optical packet signal and send out the converted signal to the optical packet switching apparatus, the optical switch control unit including:

a network analysis unit for detecting the time of arrival and packet length of the network optical packet signal;

an output-prediction-chart generator for generating an output prediction chart that indicates a temporal location of the network optical packet signal at the output port, based on the detected arrival time and packet length thereof, wherein, when a transmittable packet length detected from the output prediction chart is greater than or equal to the packet length of the client packet signal conveyed from the optical packet transmitting apparatus, the output-prediction-chart generator conveys the transmission start trigger to optical packet transmitting apparatus; and a control signal generator for outputting a control signal to the optical switch unit in the anticipation that the client optical packet signal arrives from the optical packet transmitting apparatus after a predetermined time length passes after the transmission start trigger has been conveyed.

11. The optical packet switching system according to claim 1, wherein the network optical packet signal is a WDM optical packet signal in which optical packet signals of multiple wavelengths have been wavelength-multiplexed, wherein the optical switch control unit is configured such that the free time slot is detected for each wavelength of the WDM optical packet signal, and wherein the optical packet transmitting apparatus adjusts the transmit timing and the wavelength of the client optical packet signal in such a manner that the client optical packet signal is inserted into the detected free time slot.

12. The optical packet switching system according to claim 1, further comprising an optical packet receiving apparatus configured to receive the optical packet sent out from the optical switching apparatus, wherein the optical switch unit has a network output port for outputting the optical packet signal to the exterior of the optical packet switching system and a client output port for outputting the optical packet signal to the optical packet receiving apparatus, wherein, when a temporal competition occurs between the network optical packet signals at the network output port, the optical switch control unit preferentially passes a network optical packet signal having arrived first and outputs a network optical packet signal having arrived later to the client output port, and wherein the optical packet receiving apparatus transfers the received network optical packet having arrived later, to the optical packet transmitting apparatus.

* * * * *